(12) United States Patent
Mukhopadhyay et al.

(10) Patent No.: US 8,216,677 B2
(45) Date of Patent: Jul. 10, 2012

(54) POLYCRYSTALLINE DIAMOND COMPACTS, METHODS OF MAKING SAME, AND APPLICATIONS THEREFOR

(75) Inventors: Debkumar Mukhopadhyay, Sandy, UT (US); Kenneth E Bertagnolli, Riverton, UT (US); Jair J Gonzalez, Provo, UT (US)

(73) Assignee: US Synthetic Corporation, Orem, UT (US)

( * ) Notice: Subject to any disclaimer, the term of this patent is extended or adjusted under 35 U.S.C. 154(b) by 109 days.

(21) Appl. No.: 12/649,784

(22) Filed: Dec. 30, 2009

(65) Prior Publication Data

US 2011/0067929 A1    Mar. 24, 2011

Related U.S. Application Data

(60) Provisional application No. 61/164,642, filed on Mar. 30, 2009.

(51) Int. Cl.
*B32B 9/00* (2006.01)
(52) U.S. Cl. ......... 428/408; 428/697; 428/698; 428/699
(58) Field of Classification Search .................. 51/307, 51/309; 428/408, 697, 698, 699; 75/240
See application file for complete search history.

(56) References Cited

U.S. PATENT DOCUMENTS

| | | | |
|---|---|---|---|
| 4,259,090 A | 3/1981 | Bovenkerk |
| 4,268,276 A | 5/1981 | Bovenkerk |
| 4,374,900 A | 2/1983 | Hara et al. |
| 4,410,054 A | 10/1983 | Naget et al. |
| 4,468,138 A | 8/1984 | Nagel |
| 4,560,014 A | 12/1985 | Geczy |
| 4,636,253 A | 1/1987 | Nakai et al. |
| 4,702,649 A | 10/1987 | Komanduri |
| 4,738,322 A | 4/1988 | Hall et al. |
| 4,811,801 A | 3/1989 | Salesky et al. |
| 4,828,584 A | 5/1989 | Cutler |
| 4,913,247 A | 4/1990 | Jones |
| 4,948,388 A | 8/1990 | Ringwood |
| 4,985,051 A | 1/1991 | Ringwood |
| 5,016,718 A | 5/1991 | Tandberg |

(Continued)

FOREIGN PATENT DOCUMENTS

JP    2003-013169    * 1/2003

(Continued)

OTHER PUBLICATIONS

International Search Report and Written Opinion from International Application No. PCT/US2010/060261 dated Mar. 22, 2011.

(Continued)

*Primary Examiner* — Archene Turner
(74) *Attorney, Agent, or Firm* — Workman Nydegger

(57) ABSTRACT

In an embodiment, a polycrystalline diamond compact ("PDC") comprises a cemented carbide substrate including a first cemented carbide portion exhibiting a first concentration of chromium carbide and a second cemented carbide portion bonded to the first cemented carbide portion and exhibiting a second concentration of chromium carbide that is greater than the first concentration. The PDC further comprises a polycrystalline diamond ("PCD") table bonded to the first cemented carbide portion. The PCD table includes a plurality of bonded diamond grains exhibiting diamond-to-diamond bonding therebetween, with the plurality of bonded diamond grains defining a plurality of interstitial regions. The PCD table includes chromium present in a concentration less than about 0.25 weight %.

10 Claims, 12 Drawing Sheets

U.S. PATENT DOCUMENTS

| | | | |
|---|---|---|---|
| 5,092,687 A | 3/1992 | Hall | |
| 5,120,327 A | 6/1992 | Dennis | |
| 5,135,061 A | 8/1992 | Newton, Jr. | |
| 5,154,245 A | 10/1992 | Waldenstrom et al. | |
| 5,180,022 A | 1/1993 | Brady | |
| 5,364,192 A | 11/1994 | Damm et al. | |
| 5,368,398 A | 11/1994 | Damm et al. | |
| 5,370,944 A | 12/1994 | Omori et al. | |
| 5,460,233 A | 10/1995 | Meany et al. | |
| 5,480,233 A | 1/1996 | Cunningham | |
| 5,544,713 A | 8/1996 | Dennis | |
| 5,563,107 A | 10/1996 | Dubensky et al. | |
| 5,952,102 A | 9/1999 | Cutler | |
| 6,189,634 B1 | 2/2001 | Bertagnolli et al. | |
| 6,216,805 B1 * | 4/2001 | Lays et al. | 175/432 |
| 6,254,658 B1 * | 7/2001 | Taniuchi et al. | 51/307 |
| 6,617,271 B1 | 9/2003 | Kodash et al. | |
| 6,673,307 B1 * | 1/2004 | Lindholm et al. | 419/18 |
| 6,793,681 B1 | 9/2004 | Pope et al. | |
| 6,872,356 B2 | 3/2005 | Butcher et al. | |
| 6,915,866 B2 * | 7/2005 | Middlemiss | 175/374 |
| 7,427,310 B2 * | 9/2008 | Tillman et al. | 428/547 |
| 7,449,043 B2 * | 11/2008 | Collin et al. | 428/547 |
| 7,513,320 B2 * | 4/2009 | Mirchandani et al. | 175/426 |
| 7,635,035 B1 | 12/2009 | Bertagnolli et al. | |
| 7,726,421 B2 * | 6/2010 | Middlemiss | 175/434 |
| 2004/0140132 A1 | 7/2004 | Middlemiss | |
| 2004/0141867 A1 * | 7/2004 | Dreyer et al. | 428/408 |
| 2008/0115421 A1 | 5/2008 | Sani | |
| 2011/0061944 A1 | 3/2011 | Scott et al. | |
| 2011/0083909 A1 | 4/2011 | Shen et al. | |

FOREIGN PATENT DOCUMENTS

| | | |
|---|---|---|
| WO | WO 2010/039346 | 4/2010 |
| WO | WO 2010/098978 | 9/2010 |
| WO | WO 2011/081924 | 7/2011 |

OTHER PUBLICATIONS

U.S. Appl. No. 12/185,457, filed Aug. 4, 2008, Vail, et al.
U.S. Appl. No. 13/211,493, Mail Date Jan. 17, 2012, Office Action.
U.S. Appl. No. 61/164,642, filed Mar. 30, 2009, Mukhopadhyay et al.
U.S. Appl. No. 13/211,493, filed Aug. 17, 2011, Mukhopadhyay et al.
U.S. Appl. No. 13/211,493, Mail Date Oct. 19, 2011, Office Action.

* cited by examiner

POLYCRYSTALLINE DIAMOND COMPACTS, METHODS OF MAKING SAME, AND APPLICATIONS THEREFOR

CROSS-REFERENCE TO RELATED APPLICATION(S)

This application claims the benefit of U.S. Provisional Application No. 61/164,642 filed on 30 Mar. 2009, the disclosure of which is incorporated herein, in its entirety, by this reference.

BACKGROUND

Wear-resistant, polycrystalline diamond compacts ("PDCs") are utilized in a variety of mechanical applications. For example, PDCs are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller-cone drill bits and fixed-cutter drill bits. A PDC cutting element typically includes a superabrasive diamond layer commonly known as a diamond table. The diamond table is formed and bonded to a substrate using a high-pressure/high-temperature ("HPHT") process. The PDC cutting element may also be brazed directly into a preformed pocket, socket, or other receptacle formed in a bit body. The substrate may often be brazed or otherwise joined to an attachment member, such as a cylindrical backing. A rotary drill bit typically includes a number of PDC cutting elements affixed to the bit body. It is also known that a stud carrying the PDC may be used as a PDC cutting element when mounted to a bit body of a rotary drill bit by press-fitting, brazing, or otherwise securing the stud into a receptacle formed in the bit body.

Conventional PDCs are normally fabricated by placing a cemented carbide substrate into a container with a volume of diamond particles positioned on a surface of the cemented carbide substrate. A number of such containers may be loaded into an HPHT press. The substrate(s) and volume of diamond particles are then processed under HPHT conditions in the presence of a catalyst material that causes the diamond particles to bond to one another to form a matrix of bonded diamond grains defining a polycrystalline diamond ("PCD") table. The catalyst material is often a metal-solvent catalyst (e.g., cobalt, nickel, iron, or alloys thereof) that is used for promoting intergrowth of the diamond particles.

In one conventional approach, a constituent of the cemented carbide substrate, such as cobalt from a cobalt-cemented tungsten carbide substrate, liquefies and sweeps from a region adjacent to the volume of diamond particles into interstitial regions between the diamond particles during the HPHT process. The cobalt acts as a catalyst to promote intergrowth between the diamond particles, which results in formation of a matrix of bonded diamond grains having diamond-to-diamond bonding therebetween, with interstitial regions between the bonded diamond grains being occupied by the solvent catalyst.

The presence of the solvent catalyst in the PCD table is believed to reduce the thermal stability of the PCD table at elevated temperatures. For example, the difference in thermal expansion coefficient between the diamond grains and the solvent catalyst is believed to lead to chipping or cracking of the PCD table during drilling or cutting operations, which consequently can degrade the mechanical properties of the PCD table or cause failure. Additionally, some of the diamond grains can undergo a chemical breakdown or back-conversion to graphite via interaction with the solvent catalyst. At elevated high temperatures, portions of diamond grains may transform to carbon monoxide, carbon dioxide, graphite, or combinations thereof, causing degradation of the mechanical properties of the PCD table.

Despite the availability of a number of different PDCs, manufacturers and users of PDCs continue to seek PDCs that exhibit improved toughness, wear resistance, and/or thermal stability.

SUMMARY

Embodiments of the invention relate to PDCs including a PCD table and/or a cemented carbide substrate that includes at least one of chromium carbide, tantalum carbide, or a tantalum carbide-tungsten carbide solid solution. Chromium carbide, tantalum carbide, and a tantalum carbide-tungsten carbide solid solution may improve at least one of abrasion resistance, erosion resistance, corrosion resistance, or thermal stability of the PCD table, and erosion and/or corrosion resistance of the cemented carbide substrate.

In an embodiment, a PDC includes a cemented carbide substrate including tungsten carbide and chromium carbide. The PDC further includes a PCD table bonded to the cemented carbide substrate. The PCD table includes a plurality of bonded diamond grains exhibiting diamond-to-diamond bonding therebetween and defining a plurality of interstitial regions. The PCD table further includes chromium carbide therein.

In an embodiment, a PDC includes a cemented carbide substrate including tungsten carbide and at least one of tantalum carbide or a tantalum carbide-tungsten carbide solid solution. The PDC further includes a PCD table bonded to the cemented carbide substrate. The PCD table includes a plurality of bonded diamond grains exhibiting diamond-to-diamond bonding therebetween and defining a plurality of interstitial regions. The PCD table further includes at least one of tantalum carbide or a tantalum carbide-tungsten carbide solid solution therein.

In an embodiment, a PDC includes a cemented carbide substrate. The PDC further includes a PCD table bonded to the cemented carbide substrate. The PCD table includes a plurality of bonded diamond grains exhibiting diamond-to-diamond bonding therebetween and defining a plurality of interstitial regions. The PCD table further includes chromium carbide and at least one of tantalum carbide or a tantalum carbide-tungsten carbide solid solution therein.

In an embodiment, a method of manufacturing a PDC includes positioning a mixture adjacent to a cemented carbide substrate. The mixture includes a plurality of diamond particles, and at least one of chromium carbide or tantalum carbide. The method further includes subjecting the mixture and the cemented carbide substrate to an HPHT process to sinter the plurality of diamond particles.

In an embodiment, a method of manufacturing a PDC includes positioning a diamond volume adjacent to a cemented carbide substrate. The cemented carbide substrate includes tungsten carbide and at least one of chromium carbide, tantalum carbide, or a tantalum carbide-tungsten carbide solid solution. The method further includes subjecting the diamond volume and the cemented carbide substrate to an HPHT process. In certain embodiments, the diamond volume comprises diamond powder or an at least partially leached PCD table.

In an embodiment, a PDC comprises a cemented carbide substrate including a first cemented carbide portion exhibiting a first concentration of chromium carbide and a second cemented carbide portion bonded to the first cemented carbide portion and exhibiting a second concentration of chromium carbide that is greater than the first concentration. The PDC further comprises a PCD table bonded to the first cemented carbide portion. The PCD table includes a plurality of bonded diamond grains exhibiting diamond-to-diamond bonding therebetween, with the plurality of bonded diamond grains defining a plurality of interstitial regions. The PCD table includes chromium present in a concentration less than about 0.25 weight % ("wt %").

In an embodiment, a method of manufacturing a PDC includes positioning a first cemented carbide portion between a diamond volume and a second cemented carbide portion to form an assembly. The first cemented carbide portion is substantially free of chromium and the second cemented carbide portion includes chromium carbide. The method further includes subjecting the assembly to an HPHT process to form the PDC.

Other embodiments include applications utilizing the disclosed PDCs in various articles and apparatuses, such as rotary drill bits, bearing apparatuses, wire-drawing dies, machining equipment, and other articles and apparatuses.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical elements or features in different views or embodiments shown in the drawings.

DETAILED DESCRIPTION

Embodiments of the invention relate to PDCs including a PCD table and/or a cemented carbide substrate that includes at least one of chromium carbide, tantalum carbide, or a tantalum carbide-tungsten carbide solid solution. Embodiments of methods of fabricating such PDCs are also disclosed. Chromium carbide, tantalum carbide, and a tantalum carbide-tungsten carbide solid solution may improve at least one of abrasion resistance, erosion resistance, corrosion resistance, or thermal stability of the PCD table, and erosion and/or corrosion resistance of the cemented carbide substrate. The PDCs disclosed herein may be used in a variety of applications, such as rotary drill bits, bearing apparatuses, wire-drawing dies, machining equipment, and other articles and apparatuses.

Figure 1A:
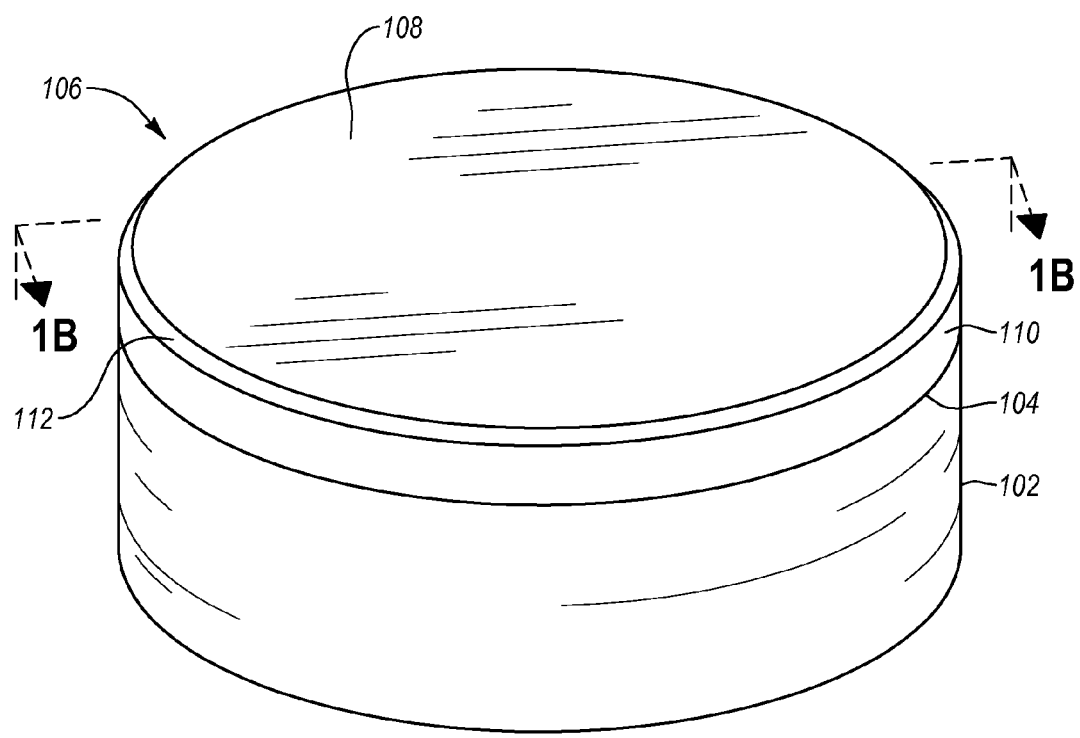
FIG. 1A is an isometric view of an embodiment of a PDC.
Figure 1B:
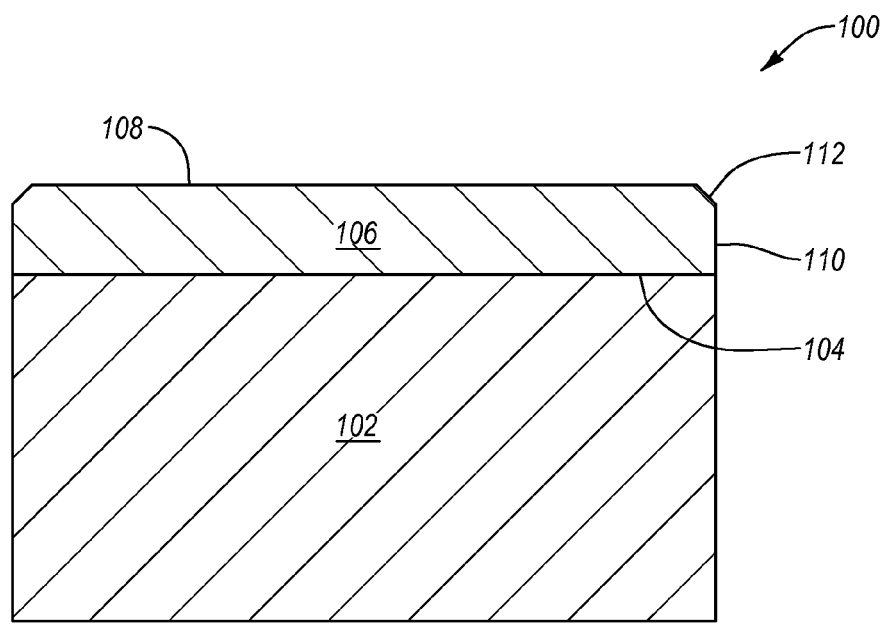
FIG. 1B is a cross-sectional view of the PDC shown in FIG. 1A taken along line 1B-1B thereof.

FIGS. 1A and 1B are isometric and cross-sectional views, respectively, of a PDC 100 according to an embodiment. The PDC 100 includes a cemented carbide substrate 102 including at least tungsten carbide grains cemented with a metallic cementing constituent, such as iron, nickel, cobalt, or alloys thereof. The cemented carbide substrate 102 includes an interfacial surface 104. In the illustrated embodiment, the interfacial surface 104 is substantially planar. However, in other embodiments, the interfacial surface 104 may exhibit a nonplanar topography.

The PDC 100 further includes a PCD table 106 bonded to the interfacial surface 104 of the cemented carbide substrate 102. The PCD table 106 includes a plurality of directly bonded-together diamond grains exhibiting diamond-to-diamond bonding therebetween (e.g., sp$^3$ bonding). The plurality of directly bonded-together diamond grains defines a plurality of interstitial regions. The PCD table 106 further includes a metal-solvent catalyst or infiltrant (e.g., iron, nickel, cobalt, or alloys thereof) that may be disposed in at least a portion of the interstitial regions, which was infiltrated from the cemented carbide substrate 102. For example, the metal-solvent catalyst or infiltrant may be disposed in substantially all or only a portion of the interstitial regions. In an embodiment, the PCD table 106 may be integrally formed with (i.e., formed from diamond powder sintered on) the cemented carbide substrate 102. In another embodiment, the PCD table 106 may be a pre-sintered PCD table that is bonded to the cemented carbide substrate 102 in an HPHT bonding process.

The PCD table 106 includes a working, upper surface 108, at least one lateral surface 110, and an optional chamfer 112 extending therebetween. However, it is noted that all or part of the at least one lateral surface 110 and/or the chamfer 112 may also function as a working surface. In the illustrated embodiment, the PDC 100 has a cylindrical geometry, and the upper surface 108 exhibits a substantially planar geometry. However, in other embodiments, the PDC 100 may exhibit a non-cylindrical geometry and/or the upper surface 108 of the PCD table 106 may be nonplanar, such as convex or concave.

The PCD table 106 includes chromium carbide (e.g., $Cr_3C_2$ or other stoichiometry), tantalum carbide, a tantalum carbide-tungsten carbide solid solution, or any combination thereof. The incorporation of chromium carbide, tantalum carbide, a tantalum carbide-tungsten carbide solid solution, or any combination thereof may improve at least one of the abrasion resistance, erosion resistance, corrosion resistance, or thermal stability of the PCD table 106. For example, chromium carbide may enhance erosion resistance and/or corrosion resistance of the PCD table 106 to abrasive fluids, such as drilling mud. Tantalum carbide or a tantalum carbide-tungsten carbide solid solution may enhance hot hardness of the PCD table 106. Chromium carbide, tantalum carbide, or a tantalum carbide-tungsten carbide solid solution may each enhance the thermal stability of the PCD table 106 compared to if only the metal-solvent catalyst was present in the interstitial regions between the bonded diamond grains of the PCD table 106.

The aforementioned metal carbides may be mixed with diamond particles prior to the diamond particles being sintered to form the PCD table 106. As an alternative to or in addition to mixing the metal carbides with the diamond particles, the metal carbides and/or one or more constituents of the metal carbides may be carried (e.g., dissolved and/or swept) into the diamond particles from the cemented carbide substrate 102. For example, chromium from chromium carbide may be dissolved in and/or carried with the metal-solvent catalyst or infiltrant during HPHT processing. In such a case, the metal-solvent catalyst or infiltrant having the chromium dissolved therein may be infiltrated into the diamond particles or an at least partially leached PCD table, and chromium carbide may precipitate during cooling. In another example, tantalum carbide may be swept into the diamond particles or the at least partially leached PCD table without dissolving into the metal-solvent catalyst or infiltrant that infiltrates into the diamond particles. However, tantalum may also be dissolved into the metal-solvent catalyst or infiltrant during HPHT processing. The metal-solvent catalyst or infiltrant having the tantalum dissolved therein may be infiltrated into the diamond particles or the at least partially leached PCD table, and tantalum carbide may precipitate during cooling.

In an embodiment, the PCD table 106 includes chromium carbide present in a concentration greater than 0 wt % to about 10 wt %, greater than 0 wt % to about 7 wt %, greater than 0 wt % to about 5 wt %, greater than 0 wt % to about 3 wt %, about 1 wt % to about 3 wt %, or about 1 wt % to about 2.5 wt %. Under some sintering conditions, high concentrations of chromium carbide (e.g., greater than about 5 wt %) may inhibit diamond grain growth and/or bonding during sintering of the diamond particles to form the PCD table 106. The chromium carbide may be interstitially disposed between the bonded diamond grains of the PCD table 106.

In another embodiment, the PCD table 106 includes tantalum carbide and/or a tantalum carbide-tungsten carbide solid solution present in a concentration greater than 0 wt % to about 15 wt %, greater than 0 wt % to about 10 wt %, greater than 0 wt % to about 7 wt %, greater than 0 wt % to about 5 wt %, about 2 wt % to about 5 wt %, greater than 0 wt % to about 3 wt %, about 1 wt % to about 3 wt %, or about 1 wt % to about 2.5 wt %. The tantalum carbide and/or a tantalum carbide-tungsten carbide solid solution may be interstitially disposed between the bonded diamond grains of the PCD table 106.

In yet another embodiment, the PCD table 106 includes chromium carbide and tantalum carbide and/or a tantalum carbide-tungsten carbide solid solution in a combined total concentration greater than 0 wt % to about 25 wt %, greater than 0 wt % to about 20 wt %, greater than 0 wt % to about 15 wt %, greater than 0 wt % to about 10 wt %, or about 4 wt % to about 8 wt %. For example, the chromium carbide may be present in the PCD table 106 in a concentration of any of the ranges previously recited for chromium carbide, and the tantalum carbide and/or the tantalum carbide-tungsten carbide solid solution may be present in the PCD table 106 in a concentration of any of the ranges previously recited for tantalum carbide and/or a tantalum carbide-tungsten carbide solid solution.

As previously discussed, the chromium carbide, tantalum carbide, and tantalum carbide-tungsten carbide solid solution may be provided, at least in part, from the cemented carbide substrate 102 during integrally forming the PCD table 106 therewith, or infiltrating and bonding the PCD table 106 in the form of a pre-sintered PCD table thereto. Thus, in such embodiments, at least part of the source of chromium carbide, tantalum carbide, and a tantalum carbide-tungsten carbide solid solution may be the cemented carbide substrate 102. In an embodiment, the cemented carbide substrate 102 may include chromium carbide grains in a concentration greater than 0 wt % to about 5 wt %, greater than 0 wt % to about 3 wt %, or about 1 wt % to about 2.5 wt %. In a more detailed embodiment, the cemented carbide substrate 102 includes about 1 wt % to about 3 wt % chromium carbide grains and about 84 wt % to about 90 wt % tungsten carbide grains cemented together with about 9 wt % to about 16 wt % cobalt or other metallic cementing constituent. Maintaining the concentration of chromium carbide below about 3 wt % may help reduce the formation of brittle double-metal carbides (e.g., eta phases of cobalt and chromium) in the cemented carbide substrate 102. The chromium carbide present in the cemented carbide substrate 102 may enhance the erosion and/or corrosion resistance thereof, and the chromium carbide present in the PCD table 106 may enhance the thermal stability, erosion resistance, and corrosion resistance thereof.

In another embodiment, the cemented carbide substrate 102 may include greater than 0 wt % to about 25 wt % tantalum carbide grains and/or a tantalum carbide-tungsten carbide solid solution grains, about 62 wt % to about 91 wt % tungsten carbide grains, and about 9 wt % to about 16 wt % cobalt or other metallic cementing constituent. In a more detailed embodiment, the cemented carbide substrate 102 may include greater than 1 wt % to about 4 wt % tantalum carbide grains and/or a tantalum carbide-tungsten carbide solid solution grains, about 83 wt % to about 90 wt % tungsten carbide grains, and about 9 wt % to about 16 wt % cobalt or other metallic cementing constituent. The average grain size of the tantalum carbide grains may be about 0.5 µm to about 3 µm, such as about 1 µm to about 2 µm. The average grain size of the tungsten carbide grains may be about 2 µm to about 6 µm, such as about 3 µm to about 5 µm.

In yet another embodiment, the cemented carbide substrate 102 may include greater than 0 wt % to about 25 wt % tantalum carbide grains and/or a tantalum carbide-tungsten carbide solid solution grains, greater than 0 wt % to about 3 wt % chromium carbide grains, about 59 wt % to about 91 wt % tungsten carbide grains, and about 9 wt % to about 16 wt % cobalt or other metallic cementing constituent. In a more detailed embodiment, the cemented carbide substrate 102 may include greater than 1 wt % to about 4 wt % tantalum carbide grains and/or a tantalum carbide-tungsten carbide solid solution grains, greater than 1 wt % to about 3 wt % chromium carbide grains, about 80 wt % to about 89 wt % tungsten carbide grains, and about 9 wt % to about 16 wt % cobalt or other metallic cementing constituent.

Figure 2:
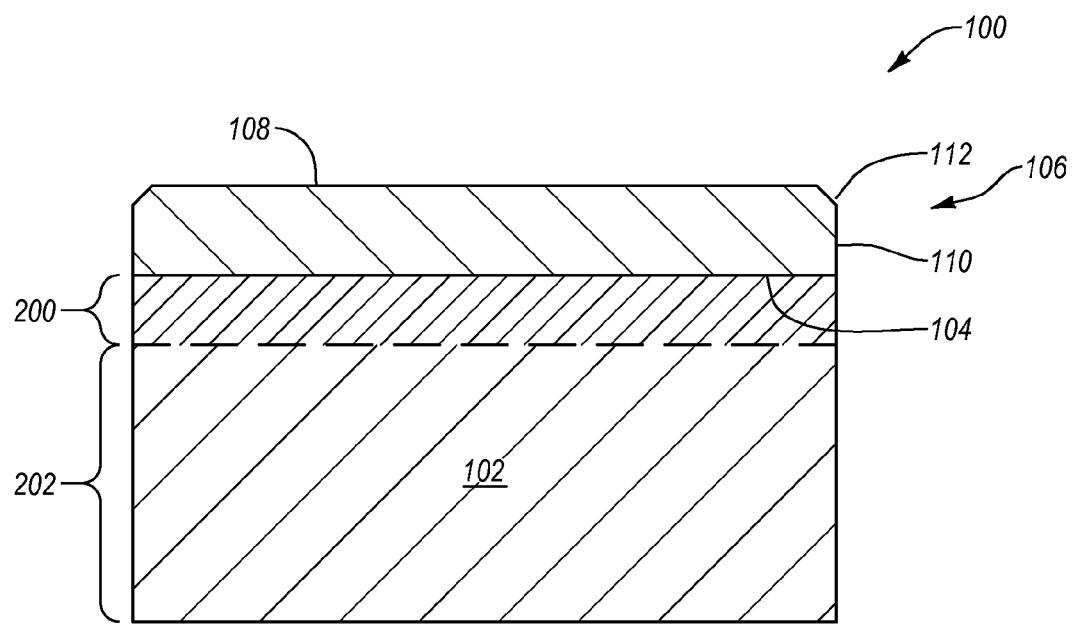
FIG. 2 is a cross-sectional view of the PDC shown in FIG. 1B illustrating a depletion region adjacent the PCD table from which chromium carbide, tantalum carbide, or a tantalum carbide-tungsten carbide solid solution is depleted according to an embodiment.

Referring to FIG. 2, when the cemented carbide substrate 102 includes chromium carbide grains, tantalum carbide grains, tantalum carbide-tungsten carbide solid solution grains, or any combination thereof, a depletion region 200 may be formed adjacent to the PCD table 106. For example, the depletion region 200 is depleted of metal-solvent catalyst/infiltrant, chromium carbide, tantalum carbide, a tantalum carbide-tungsten carbide solid solution, or any combination thereof relative to a bulk 202 of the cemented carbide substrate 102. The depletion of one or more of such metal carbides from the depletion region 200 is due to the cementing constituent of the cemented carbide substrate 102 liquefying and carrying chromium dissolved therein, tantalum dissolved therein, chromium carbide particles, tantalum carbide particles, particles made of a tantalum carbide-tungsten carbide solid solution, or combinations of the foregoing during HPHT fabrication of the PDC 100.

Figure 3:
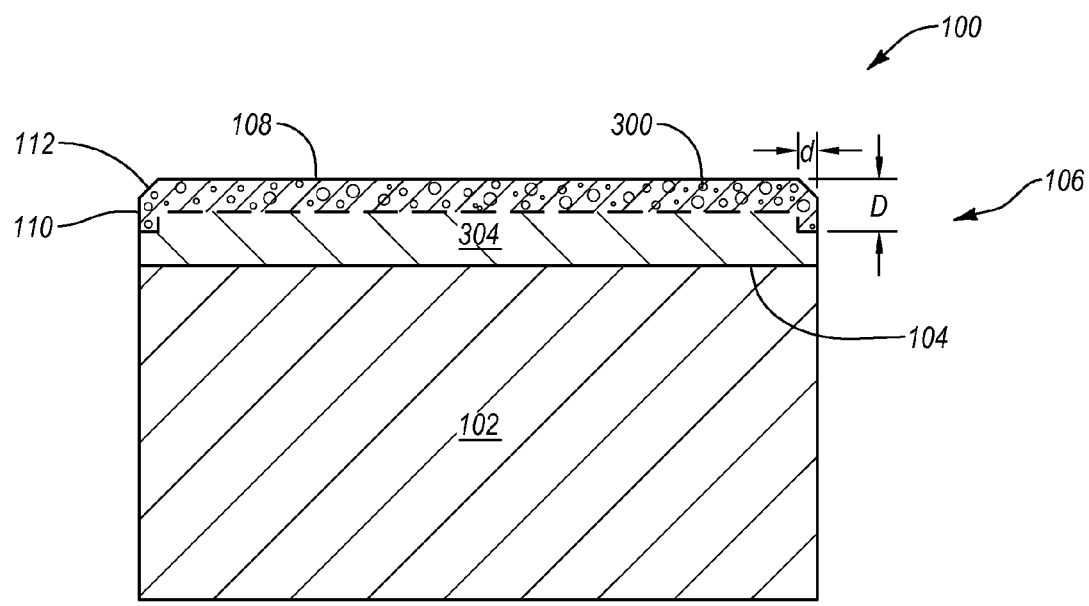
FIG. 3 is a cross-sectional view of the PDC shown in FIG. 1B after leaching a region of the PCD table that is remote from the cemented carbide substrate according to an embodiment.

FIG. 3 is a cross-sectional view of an embodiment of the PDC 100 after a selected portion of the PCD table 106 has been leached to at least partially remove the metal-solvent catalyst or infiltrant therefrom. After leaching in a suitable acid (e.g., nitric acid, hydrochloric acid, hydrofluoric acid, or mixtures thereof) for a suitable period of time (e.g., 12-24 hours), the PCD table 106 includes a leached region 300 that extends inwardly from the upper surface 108 to a selected depth D. The leached region 300 may also extend inwardly from the at least one lateral surface 110 to a selected distance d. The leached region 300 may extend along any desired edge geometry (e.g., the chamfer 112, a radius, etc.) and/or the lateral surface 110, as desired. The PCD table 106 further includes a region 304 that is relatively unaffected by the leaching process.

In some embodiments, the distance d may be about equal to the depth D. The depth D may be about 10 µm to about 1000 µm, such as about 10 µm to about 500 µm, about 20 µm to about 150 µm, about 30 µm to about 90 µm, about 20 µm to about 75 µm, about 200 µm to about 300 µm, or about 250 µm to about 500 µm. When the PCD table 106 includes chromium carbide therein, the depths D and d of the leached region 300 may be relatively more shallow (for a given leaching time) than when the PCD table 106 includes tantalum carbide and/or a tantalum carbide-tungsten carbide solid solution and is free of chromium carbide because the metal-solvent catalyst or infiltrant incorporated into the PCD table 106 may alloy with chromium from the chromium carbide during HPHT processing. For example, when the metal-solvent catalyst in the PCD table 106 is cobalt or a cobalt alloy, alloying with chromium produces a corrosion-resistant alloy that is chemically resistant to leaching.

Figure 4:
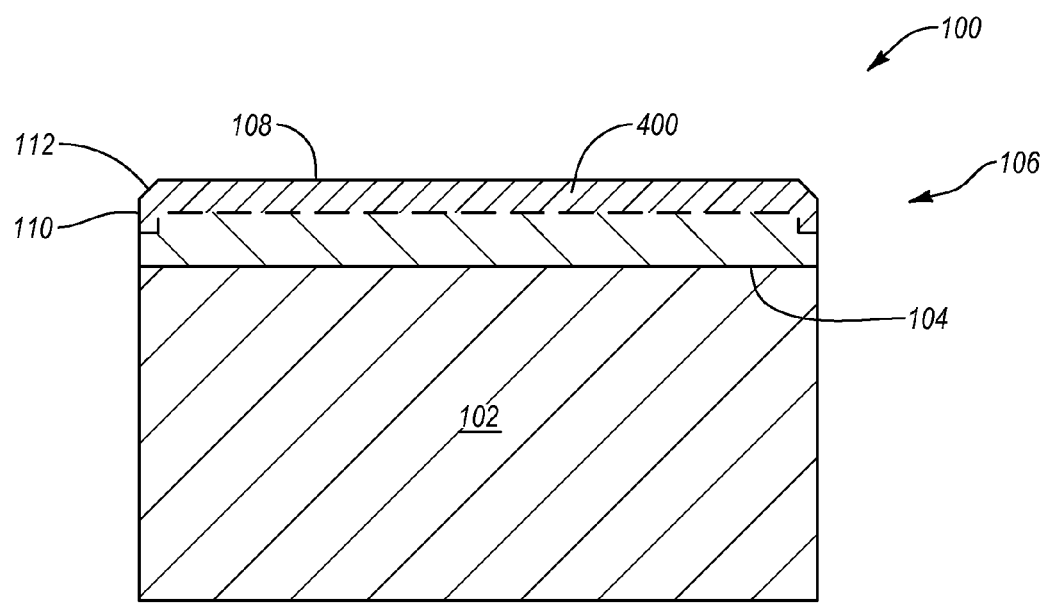
FIG. 4 is a cross-sectional view of the PDC shown in FIG. 1B after infiltrating a region of the PCD table with an infiltrant according to an embodiment.

FIG. 4 is a cross-sectional view of the PDC 100 shown in FIG. 1B after infiltrating a region 400 of the PCD table 106 that is remote from the cemented carbide substrate 102. The region 400 may be infiltrated with an infiltrant during integrally forming the PCD table 106 with the cemented carbide substrate 102, or prior to, during, or after bonding the PCD table 106 to the cemented carbide substrate 102. The infiltrant may be selected from silicon, silicon-cobalt alloys, a nonmetallic catalyst, and combinations of the foregoing. For example, the nonmetallic catalyst may be selected from a carbonate (e.g., one or more carbonates of Li, Na, K, Be, Mg, Ca, Sr, and Ba), a sulfate (e.g., one or more sulfates of Be, Mg, Ca, Sr, and Ba), a hydroxide (e.g., one or more hydroxides of Be, Mg, Ca, Sr, and Ba), elemental phosphorous and/or a derivative thereof, a chloride (e.g., one or more chlorides of Li, Na, and K), elemental sulfur and/or a derivative thereof, a polycyclic aromatic hydrocarbon (e.g., naphthalene, anthracene, pentacene, perylene, coronene, or combinations of the foregoing) and/or a derivative thereof, a chlorinated hydrocarbon and/or a derivative thereof, a semiconductor material (e.g., germanium or a germanium alloy), and combinations of the foregoing.

One suitable carbonate catalyst is an alkali metal carbonate material including a mixture of sodium carbonate, lithium carbonate, and potassium carbonate that form a low-melting ternary eutectic system. This mixture and other suitable alkali metal carbonate materials are disclosed in U.S. patent application Ser. No. 12/185,457, which is incorporated herein, in its entirety, by this reference. The alkali metal carbonate material disposed in the interstitial regions of the region 400 may be partially or substantially completely converted to one or more corresponding alkali metal oxides by suitable heat treatment following infiltration.

Referring again to FIG. 3, in some embodiments, the leached region 300 may be infiltrated with a nonmetallic catalyst, such as any of the aforementioned nonmetallic metal-carbonate catalysts. For example, after infiltration, the infiltrated nonmetallic metal-carbonate catalyst may be partially or substantially completely converted to one or more corresponding metal oxides.

Figure 5:
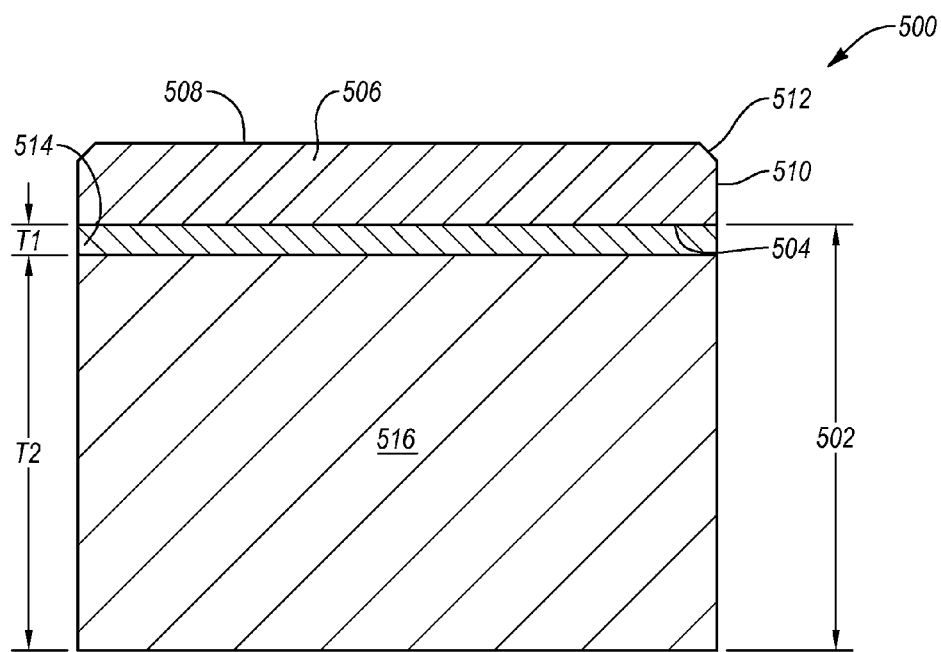
FIG. 5 is a cross-sectional view of another embodiment of a PDC in which the concentration of chromium in the PCD table thereof is minimized to facilitate leaching while the substrate includes chromium carbide to enhance erosion and/or corrosion resistance thereof.

FIG. 5 is a cross-sectional view of another embodiment of a PDC 500 in which the concentration of chromium in a PCD table thereof is minimized to facilitate leaching while the substrate includes chromium carbide to enhance erosion and/or corrosion resistance thereof. The PDC 500 includes a cemented carbide substrate 502 having an interfacial surface 504 bonded to a PCD table 506. The PCD table 506 includes a working, upper surface 508, at least one lateral surface 510, and an optional chamfer 512 extending therebetween. The PCD table 506 further includes a plurality of directly bonded-together diamond grains exhibiting diamond-to-diamond bonding therebetween (e.g., $sp^3$ bonding). The plurality of directly bonded-together diamond grains defines a plurality of interstitial regions. The PCD table 506 further includes a metal-solvent catalyst or infiltrant (e.g., iron, nickel, cobalt, or alloys thereof) that may be disposed in at least a portion of the interstitial regions.

In an embodiment, the PCD table 506 may be integrally formed with (i.e., formed from diamond powder sintered on) the cemented carbide substrate 502. In another embodiment, the PCD table 506 may be a pre-sintered PCD table that is bonded to the cemented carbide substrate 502 in an HPHT bonding process.

In some embodiments, the PCD table 506 may be substantially free of chromium. In other embodiments, chromium may be present in the PCD table 506 in a low concentration, such as less than about 0.25 wt %, about 0.10 wt % to about 0.20 wt %, about 0.010% to about 0.050 wt %, about 0.050 wt % to about 0.075 wt %, about 0.80 wt % to about 1.0 wt %, about 0.60 wt % to about 0.80 wt %, or about 0.25 wt % to about 0.50 wt %. The chromium may be present in the form of chromium carbide and/or alloyed with the metal-solvent catalyst or infiltrant to form, for example, a cobalt-chromium alloy. The concentration of the chromium may be greater at the interface between the PCD table 506 and the cemented carbide substrate 502 than at the upper surface 508 of the PCD table 506.

The cemented carbide substrate 502 of the PDC 500 includes a first cemented carbide portion 514 and a second cemented carbide portion 516. The first cemented carbide portion 514 is disposed between and bonded to the PCD table 502 and the second cemented carbide portion 516. The first cemented carbide portion 514 may exhibit a thickness T1 of about 0.0050 inch to about 0.100 inch, such as about 0.0050 inch to about 0.030 inch, or about 0.020 inch to about 0.025 inch. The second cemented carbide portion 516 may exhibit a thickness T2 of about 0.30 inch to about 0.60 inch. In other embodiments, the first cemented carbide portion 514 may be replaced with a metallic disc, such as a disc of iron, nickel, cobalt, or alloys thereof.

After HPHT processing, the first cemented carbide portion 514 exhibits a first concentration of chromium carbide and the second cemented carbide portion 516 exhibits a second concentration of chromium carbide that is about 1.1 to about 1.7 times (e.g., about 1.3-1.5 times) greater than the first concentration. In an embodiment, the first cemented carbide portion 514 may comprise about 9 wt % to about 16 wt % cobalt, about 0.50 wt % to about 1.5 wt % chromium carbide, with the balance being substantially tungsten carbide. The second cemented carbide portion 516 may comprise about 9 wt % to about 16 wt % cobalt, about 0.50 wt % to about 3.0 wt % chromium carbide, with the balance being substantially tungsten carbide. For example, the first cemented carbide portion 514 may comprise about 13 wt % cobalt, about 0.70 wt % to about 0.80 wt % chromium carbide with the balance being tungsten carbide, while the second cemented carbide portion 516 may comprise about 13 wt % cobalt, about 1.0 wt % chromium carbide with the balance being tungsten carbide.

Figure 6A:
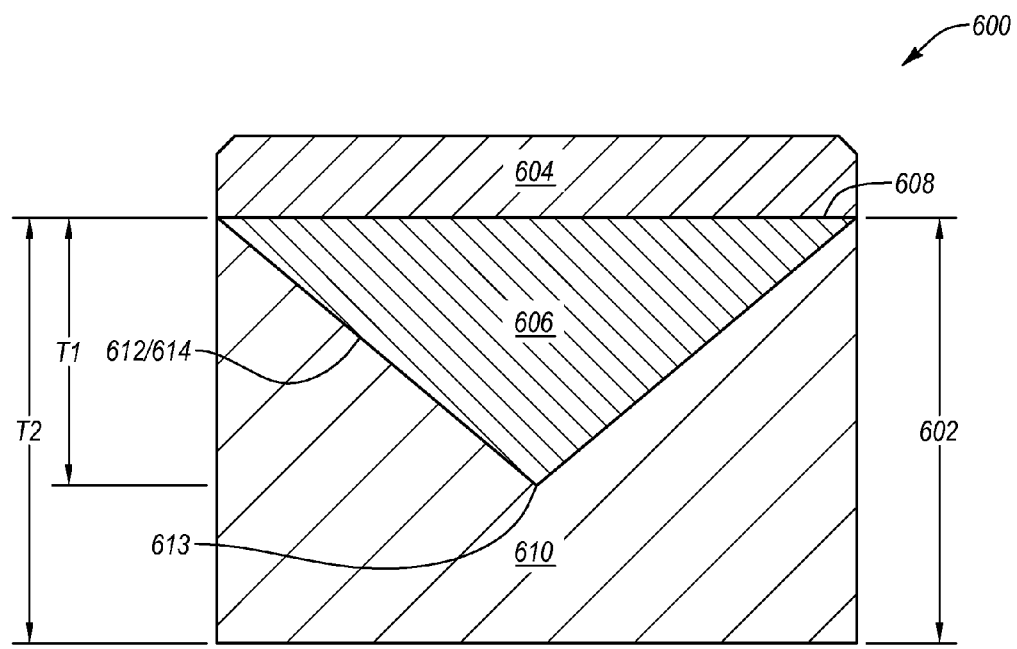
FIG. 6A is a cross-sectional view of yet another embodiment of a PDC in which the concentration of chromium in the PCD table thereof is minimized to facilitate leaching while the substrate includes chromium carbide to enhance erosion and/or corrosion resistance thereof.

FIG. 6A is a cross-sectional view of yet another embodiment of a PDC 600 in which the concentration of chromium in the PCD table thereof is minimized to facilitate leaching while the substrate includes chromium carbide to enhance erosion and/or corrosion resistance thereof. The PDC 600 mainly differs from the PDC 500 shown in FIG. 5 in that a cemented carbide substrate 602 of the PDC 600 is configured differently than the cemented carbide substrate 502. Therefore, in the interest of brevity, only the differences between the PDC 500 and the PDC 600 are described in detail below.

The PDC 600 includes a PCD table 604 (e.g., a pre-sintered or integrally formed PCD table) that may be substantially free of chromium or may comprise a small concentration of chromium, such as less than about 0.25 wt %, about 0.10 wt % to about 0.20 wt %, about 0.010% to about 0.050 wt %, about 0.050 wt % to about 0.075 wt %, about 0.80 wt % to about 1.0 wt %, about 0.60 wt % to about 0.80 wt %, or about 0.25 wt % to about 0.50 wt %. The PCD table 604 is bonded to the cemented carbide substrate 602. The cemented carbide substrate 602 includes a first cemented carbide portion 606 having an interfacial surface 608 that is bonded to the PCD table 604 and a second cemented carbide portion 610 bonded to the first cemented carbide portion 606. In the illustrated embodiment, the interfacial surface 608 is substantially planar. However, in other embodiments, the interfacial surface 608 may exhibit a nonplanar topography. The first cemented carbide portion 606 may exhibit any of the compositions disclosed for the first cemented carbide portion 514 and the second cemented carbide portion 610 may exhibit any of the compositions disclosed for the second cemented carbide portion 516.

In the illustrated embodiment, the first cemented carbide portion 606 may exhibit a conical geometry having a triangular cross-sectional geometry. The first cemented carbide portion 606 is received in a recess 612 formed in the second cemented carbide portion 610. The first cemented carbide portion 606 extends from the interfacial surface 608 to an apex 613 to define a thickness T1, which may be about 0.050 inch to about 0.150 inch, such as about 0.075 inch to about 0.100 inch. A thickness T2 of the second cemented carbide portion 610 may be about 0.30 inch to about 0.60 inch. The second cemented carbide portion 610 substantially surrounds and is bonded to a lateral periphery 614 of the first cemented carbide portion 606 to define an interface that is observable in, for example, a scanning electron microscope ("SEM"). By substantially surrounding the lateral periphery 614 of the first cemented carbide portion 606, the more erosion/corrosion resistant, higher chromium-content second cemented carbide portion 606 protects the lower chromium-content first cemented carbide portion 606 from abrasive drilling conditions, such as drilling mud. However, in other embodiments, the first cemented carbide portion 606 may exhibit another selected protruding geometry provided that a lateral periphery thereof is substantially surrounded by the second cemented carbide portion 610. Other complementary geometries for the first and second cemented carbide portions 606 and 610 may be employed.

Figure 6B:
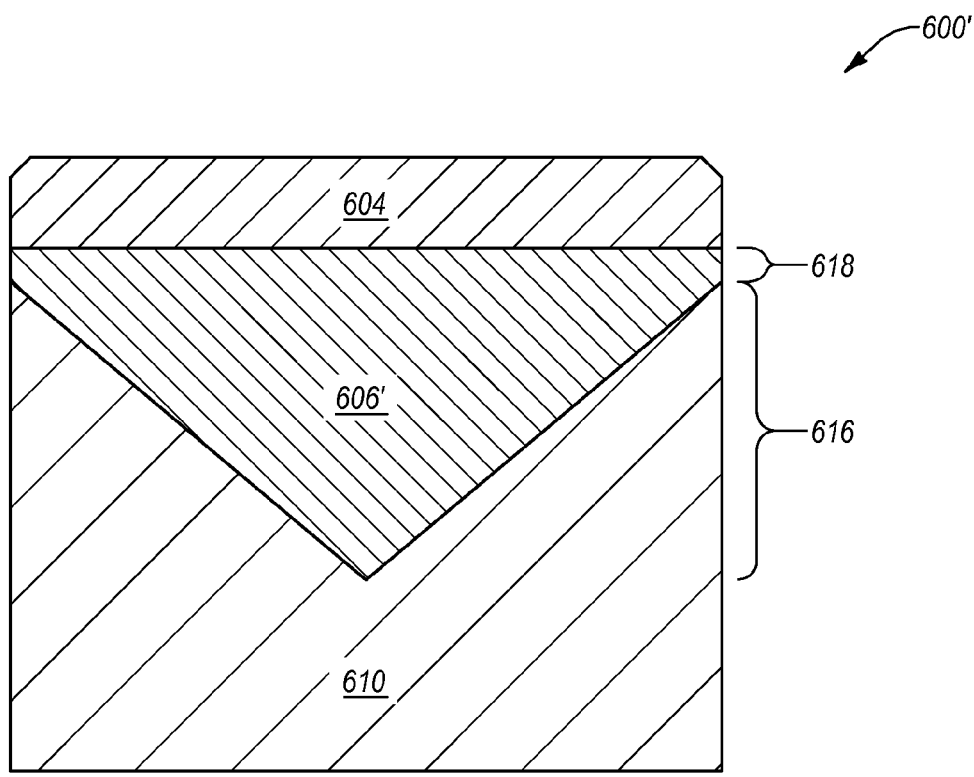
FIG. 6B is a cross-sectional view of a further embodiment of a PDC in which the concentration of chromium in the PCD table thereof is minimized to facilitate leaching while the substrate includes chromium carbide to enhance erosion and/or corrosion resistance thereof.

As discussed above, the first cemented carbide portion 606 may exhibit other configurations besides the illustrated configuration shown in FIG. 6A. For example, FIG. 6B is a cross-sectional view of a PDC 600' according to another embodiment. The PDC 600' includes a first cemented carbide portion 606' comprising a conical portion 616 and a disk portion 618. The disk portion 618 that extends above the recess 612 is formed in the second cemented carbide portion 610 and is bonded to the PCD table 604.

The PCD tables 506 and 604 shown in FIGS. 5-6B may be leached to a selected depth to form a leached region that extends inwardly from, for example, the upper surface 508 shown in FIG. 5. The selected depth may be about 10 μm to about 1000 μm, such as about 10 μm to about 500 μm, about 20 μm to about 150 μm, about 30 μm to about 90 μm, about 20 μm to about 75 μm, about 200 μm to about 300 μm, or about 250 μm to about 500 μm. Because the PCD tables 506 and 604 contain a relatively small concentration of chromium they are more easily leached to deplete the metal-solvent catalyst or infiltrant therefrom. If desired, the leached region may be infiltrated with any the infiltrant materials disclosed herein.

Figure 7:
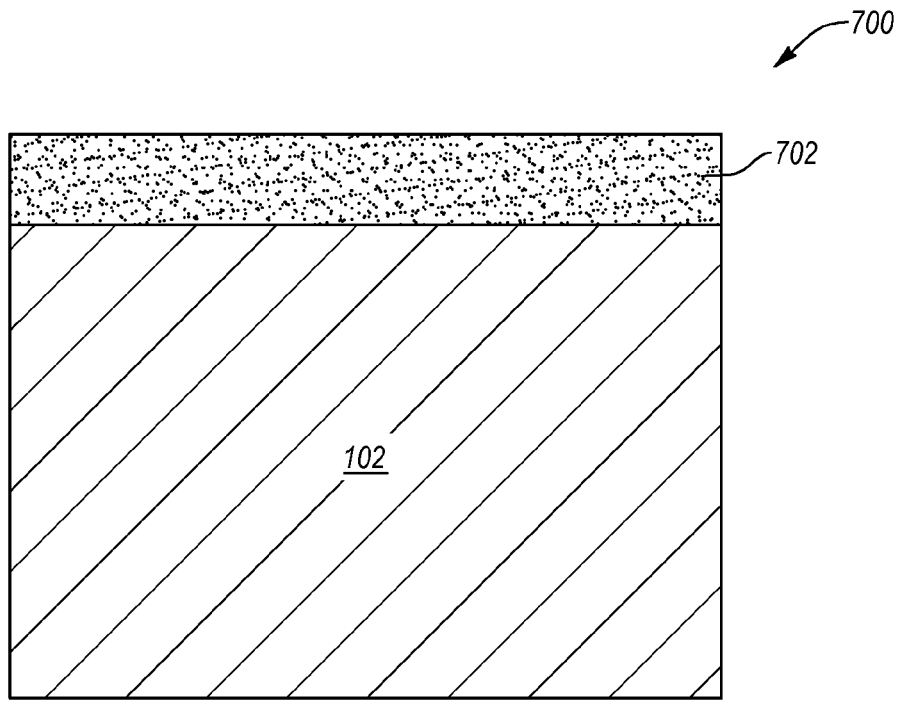
FIG. 7 is a cross-sectional view of an assembly to be HPHT processed to form the PDC shown in FIGS. 1A and 1B according to an embodiment of method.

FIG. 7 is a cross-sectional view of an assembly 700 to be HPHT processed to form the PDC shown in FIGS. 1A and 1B according to an embodiment of method. At least one layer 702 may be positioned adjacent to the interfacial surface 104 of the cemented carbide substrate 102. The at least one layer 702 includes a plurality of diamond particles that may exhibit one or more selected sizes.

The one or more selected sizes may be determined, for example, by passing the diamond particles through one or more sizing sieves or by any other method. In an embodiment, the plurality of diamond particles may include a relatively larger size and at least one relatively smaller size. As used herein, the phrases "relatively larger" and "relatively smaller" refer to particle sizes determined by any suitable method, which differ by at least a factor of two (e.g., 40 μm and 20 μm). More particularly, in various embodiments, the plurality of diamond particles may include a portion exhibiting a relatively larger size (e.g., 100 μm, 90 μm, 80 μm, 70 μm, 60 μm, 50 μm, 40 μm, 30 μm, 20 μm, 15 μm, 12 μm, 10 μm, 8 μm) and another portion exhibiting at least one relatively smaller size (e.g., 30 μm, 20 μm, 10 μm, 15 μm, 12 μm, 10 μm, 8 μm, 4 μm, 2 μm, 1 μm, 0.5 μm, less than 0.5 μm, 0.1 μm, less than 0.1 μm). In an embodiment, the plurality of diamond particles may include a portion exhibiting a relatively larger size between about 40 μm and about 15 μm and another portion exhibiting a relatively smaller size between about 12 μm and 2 μm. The plurality of diamond particles may also include three or more different sizes (e.g., one relatively larger size and two or more relatively smaller sizes) without limitation.

As discussed above, chromium carbide may be incorporated into the PCD table 106 (FIGS. 1A and 1B) by mixing chromium carbide particles with the diamond particles of the at least one layer 702 using any suitable mixing process, such as a milling process or any other suitable process. The chromium carbide particles may be present in a concentration greater than 0 wt % to about 15 wt %, greater than 0 wt % to about 10 wt %, greater than 0 wt % to about 7 wt %, greater than 0 wt % to about 3 wt %, about 1 wt % to about 3 wt %, or about 1 wt % to about 2.5 wt %, with the balance being substantially the diamond particles. In another embodiment, tantalum carbide may be mixed with the diamond particles in a concentration greater than 0 wt % to about 10 wt %, greater than 0 wt % to about 7 wt %, greater than 0 wt % to about 3 wt %, about 1 wt % to about 3 wt %, or about 1 wt % to about 2.5 wt %, with the balance being substantially the diamond particles.

In yet another embodiment, chromium carbide and tantalum carbide may be mixed with the diamond particles. For example, the combined total concentration of chromium carbide and tantalum carbide may be greater than 0 wt % to about 25 wt %, greater than 0 wt % to about 20 wt %, greater than 0 wt % to about 15 wt %, greater than 0 wt % to about 10 wt %, or about 4 wt % to about 8 wt %. For example, the chromium carbide may be present in a concentration of any of the ranges previously recited for chromium carbide, and tantalum carbide may be present in a concentration of any of the ranges previously recited for tantalum carbide.

In addition to or as alternative to mixing chromium carbide and/or tantalum carbide with the diamond particles, the cemented carbide substrate 102 may include chromium carbide, tantalum carbide, a tantalum carbide-tungsten carbide solid solution, or any combination thereof. For example, the cemented carbide substrate 102 may exhibit any of the cemented-carbide-substrate compositions, previously described above, which include chromium carbide, tantalum carbide, a tantalum carbide-tungsten carbide solid solution, or any combination thereof. In such embodiments, the cemented carbide substrate 102 functions as the source of chromium, chromium carbide, tantalum, tantalum carbide, a tantalum carbide-tungsten carbide solid solution, or any combination thereof for the chromium carbide, tantalum carbide, tantalum carbide-tungsten carbide solid solution, or any combination thereof that ultimately occupies at least a portion of the interstitial regions of the PCD table 106 (FIGS. 1A and 1B).

The assembly 700 of the cemented carbide substrate 102 and the at least one layer 702 may be placed in a pressure transmitting medium, such as a refractory metal can embedded in pyrophyllite or other pressure transmitting medium. The pressure transmitting medium, including the cemented carbide substrate 102 and the at least one layer 702, may be subjected to an HPHT process using an ultra-high pressure press to create temperature and pressure conditions at which diamond is stable. The temperature of the HPHT process may be at least about 1000° C. (e.g., about 1200° C. to about 1600° C.) and the pressure of the HPHT process may be at least 4.0 GPa (e.g., about 5.0 GPa to about 8.0 GPa) for a time sufficient to sinter the diamond particles to form the PCD table 106 (FIGS. 1A and 1B). For example, the pressure of the HPHT process may be about 5 GPa to about 7 GPa and the temperature of the HPHT process may be about 1150° C. to about 1450° C. (e.g., about 1200° C. to about 1400° C.). Upon cooling from the HPHT process, the PCD table 106 becomes metallurgically bonded to the cemented carbide substrate 102. In some embodiments, the PCD table 106 may be leached to enhance the thermal stability thereof, as previously described with respect to FIG. 3 and, if desired, the leached region may be infiltrated with any of the disclosed infiltrants.

During the HPHT process, the cementing constituent from the cemented carbide substrate 102 may liquefy and infiltrate into the diamond particles of the at least one layer 702. The infiltrated cementing constituent functions as a catalyst that catalyzes formation of directly bonded-together diamond grains to sinter the diamond particles so that the PCD table 106 is formed. In embodiments when the cemented carbide substrate 102 includes chromium carbide, tantalum carbide, a tantalum carbide-tungsten carbide solid solution, or any combination thereof the liquefied cementing constituent may carry chromium and/or tantalum dissolved therein. In another embodiment, chromium carbide particles, tantalum carbide particles, particles made from a tantalum carbide-tungsten carbide solid solution, or any combination thereof may also be swept into the at least one layer 702 by the infiltrating cementing constituent to be incorporated in the PCD table 106 so-formed.

Figure 8:
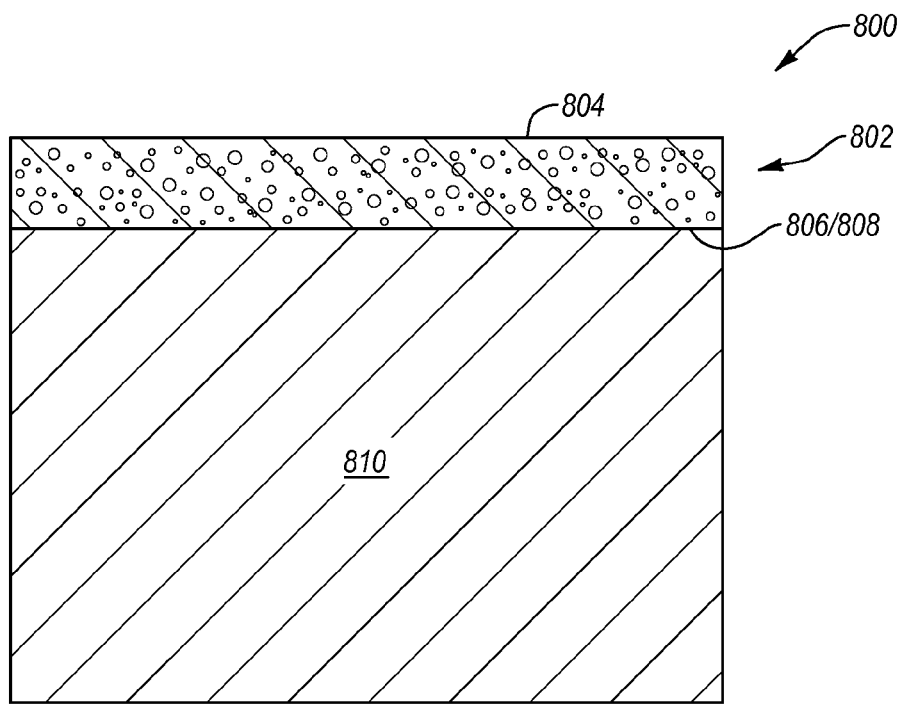
FIG. 8 is a cross-sectional view of an assembly to be HPHT processed to form the PDC shown in FIGS. 1A and 1B according to another embodiment of method.

FIG. 8 is a cross-sectional view of an assembly 800 to be HPHT processed to form the PDC 100 shown in FIGS. 1A and 1B according to another embodiment. In the method described with respect to FIG. 8, the plurality of un-sintered diamond particles in the at least one layer 702 is replaced with another type of diamond volume.

The assembly 800 comprises an at least partially leached PCD table 802 including an upper surface 804 and an interfacial surface 806. The at least partially leached PCD table 802 includes a plurality of directly bonded-together diamond grains exhibiting diamond-to-diamond bonding therebetween (e.g., $sp^3$ bonding). The plurality of directly bonded-together diamond grains define a plurality of interstitial regions. The interstitial regions form a network of at least partially interconnected pores that enable fluid to flow from the upper surface 804 to the interfacial surface 806. The at least partially leached PCD table 802 is positioned so that the interfacial surface 806 thereof is positioned adjacent to an interfacial surface 808 of a cemented carbide substrate 810. The cemented carbide substrate 810 may have a composition that is the same as any of the cemented carbide material used for the cemented carbide substrate 102 that includes chromium carbide, tantalum carbide, a tantalum carbide-tungsten carbide solid solution, or any combination thereof, as discussed hereinabove.

The at least partially leached PCD table 802 may be formed by HPHT sintering a plurality of diamond particles having any of the aforementioned diamond particle size distributions in the presence of a metal-solvent catalyst (e.g., iron, nickel, cobalt, or alloys thereof) under any of the disclosed diamond-stable HPHT conditions. For example, the metal-solvent catalyst may be infiltrated into the diamond particles from a metal-solvent-catalyst disc (e.g., a cobalt disc), infiltrated from a cobalt-cemented tungsten carbide substrate, mixed with the diamond particles, or combinations of the foregoing. At least a portion of or substantially all of the metal-solvent catalyst may be removed from the sintered PCD body by leaching. For example, the metal-solvent catalyst may be at least partially removed from the sintered PCD table by immersion in an acid, such as aqua regia, nitric acid, hydrofluoric acid, or other suitable acid, to form the at least partially leached PCD table 802. The sintered PCD table may be immersed in the acid for about 2 to about 7 days (e.g., about 3, 5, or 7 days) or for a few weeks (e.g., about 4 weeks) depending on the amount of leaching that is desired. In an embodiment, the metal-solvent catalyst may be substantially free of chromium as an alloying addition to improve the degree to which the metal-solvent catalyst may be removed. In such an embodiment, because chromium is not employed in the synthesis of the at least partially leached PCD table 802, the at least partially leached PCD table 802 may be substantially free of chromium. It is noted that a residual amount of the metal-solvent catalyst may still remain even after leaching for extended periods of time.

When the metal-solvent catalyst is infiltrated into the diamond particles from a cemented tungsten carbide substrate including tungsten carbide grains cemented with a metal-solvent catalyst (e.g., cobalt, nickel, iron, or alloys thereof), the infiltrated metal-solvent catalyst may carry tungsten and/or tungsten carbide therewith. The at least partially leached PCD table 802 may include such tungsten and/or tungsten carbide therein disposed interstitially between the bonded diamond grains. The tungsten and/or tungsten carbide may be at least partially removed by the selected leaching process or may be relatively unaffected by the selected leaching process.

The assembly 800 of the at least partially leached PCD table 802 and the cemented carbide substrate 810 may be placed in a pressure transmitting medium, such as a refractory metal can embedded in pyrophyllite or other pressure transmitting medium. The pressure transmitting medium, including the assembly 800, may be subjected to an HPHT process using an ultra-high pressure press to create temperature and pressure conditions at which diamond is stable. The temperature of the HPHT process may be at least about 1000° C. (e.g., about 1200° C. to about 1600° C.) and the pressure of the HPHT process may be at least 4.0 GPa (e.g., about 5.0 GPa to about 8.0 GPa) so that the cementing constituent in the cemented carbide substrate 810 liquefies and infiltrates into the at least partially leached PCD table 802. For example, the pressure of the HPHT process may be about 5 GPa to about 7 GPa and the temperature of the HPHT process may be about 1150° C. to about 1450° C. (e.g., about 1200° C. to about 1400° C.). Upon cooling from the HPHT process, the infiltrated PCD table (also referred to as a pre-sintered PCD table) represented as the PCD table 106 in FIGS. 1A and 1B becomes bonded to the cemented carbide substrate 810.

As noted above, the cemented carbide substrate 810 includes chromium carbide, tantalum carbide, a solid solution of tantalum carbide, tungsten carbide, or any combination thereof. The infiltrated cementing constituent may carry chromium and/or tantalum dissolved therein during infiltration. The infiltrated cementing constituent may also carry chromium carbide particles, tantalum carbide particles, particles made from a tantalum carbide-tungsten carbide solid solution, or any combination thereof during infiltration. As such, the at least partially leached PCD table 802 infiltrated with the cementing constituent includes chromium carbide, tantalum carbide, a tantalum carbide-tungsten carbide solid solution, or any combination thereof interstitially disposed between the bonded diamond grains thereof.

In an embodiment, the HPHT process conditions may be controlled so that the cementing constituent from the cemented carbide substrate 810 only partially infiltrates the at least partially leached PCD table 802 to form a first region remote from the cemented carbide substrate 810 in which the interstitial regions thereof remain substantially unfilled by the cementing constituent. The distance that the cementing constituent infiltrates into the at least partially leached PCD table 802 may be controlled by selecting the pressure, temperature, and process time employed in the HPHT process. In an embodiment, the assembly 800 may be subjected to a temperature of about 1150° C. to about 1300° C. (e.g., about 1270° C. to about 1300° C.) and a corresponding pressure that is within the diamond stable region, such as about 5.0 GPa. Such temperature and pressure conditions are lower than temperature and pressure conditions typically used to fully infiltrate the at least partially leached PCD table 802.

In other embodiments, the cementing constituent from the cemented carbide substrate 810 substantially infiltrates the at least partially leached PCD table 802 so that substantially all of the interstitial regions are infiltrated and filled by the cementing constituent infiltrated into the at least partially leached PCD table 802 from the cemented carbide substrate 810. If desired, after infiltrating and bonding the at least partially leached PCD table 802 to the cemented carbide substrate 810, the cementing constituent that occupies the interstitial regions may be at least partially removed in a subsequent leaching process using an acid (e.g., aqua regia, nitric acid, hydrofluoric acid, or other suitable acid) to form, for example, the leached region 300 shown in FIG. 3.

In another embodiment, at least one layer of silicon, a silicon-cobalt alloy, or a mixture of cobalt and silicon particles may be disposed adjacent to the upper surface 804 of the at least partially leached PCD table 802 and may infiltrate the at least partially leached PCD table 802 during the HPHT process to fill the interstitial regions of the region 400 (FIG. 4) with an infiltrant and/or a reaction product between the infiltrant and the diamond grains. As previously discussed, such an infiltrant and/or a reaction product may include silicon, a silicon-cobalt alloy (e.g., cobalt silicide), silicon carbide, cobalt carbide, a mixed carbide of cobalt and silicon, or combinations of the foregoing. For example, silicon carbide, cobalt carbide, and a mixed carbide of cobalt and silicon are reaction products that may be formed by the infiltrant reacting with the diamond grains of the at least partially leached PCD table 802. In an embodiment, the layer includes silicon particles present in a concentration of about 50 to about 60 wt % and cobalt particles present in a concentration of about 40 to about 50 wt %. In a more specific embodiment, the layer includes silicon particles and cobalt particles present in a concentration of about equal to or near a eutectic composition of the silicon-cobalt chemical system. In some embodiments, the silicon particles and cobalt particles may be held together by an organic binder to form a green layer of cobalt and silicon particles. In another embodiment, the layer may comprise a thin sheet of a silicon-cobalt alloy or a green layer of silicon-cobalt alloy particles formed by mechanical alloying having a low-melting eutectic or near eutectic composition.

Referring again to FIGS. 4 and 8, in another embodiment, the interstitial regions of the region 400 may be infiltrated before, during, or after the HPHT processing that bonds the at least partially leached PCD table 802 to the cemented carbide substrate 810 (labeled as 102 in FIG. 4) with an infiltrant. For example, the infiltrant may comprise any of the nonmetallic catalyst materials disclosed herein.

Figure 9A:
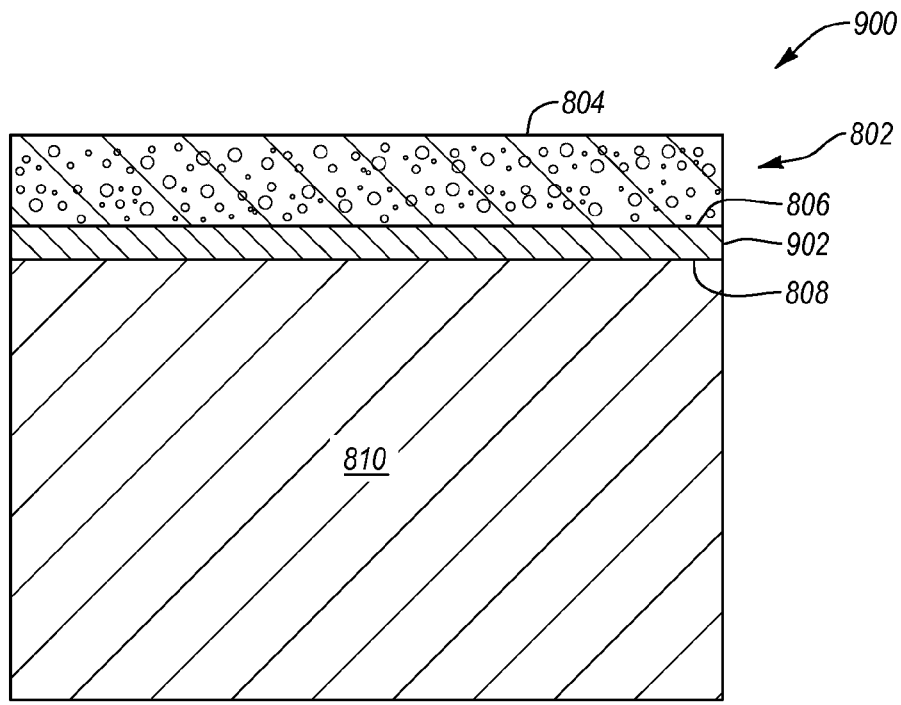
FIG. 9A is a cross-sectional view of an assembly to be HPHT processed to form the PDC shown in FIG. 5 according to yet another embodiment of method.

FIG. 9A is a cross-sectional view of an assembly 900 to be HPHT processed to form the PDC 500 shown in FIG. 5 according to yet another embodiment of a method. The assembly 900 may be formed by positioning a relatively thin cemented carbide portion 902 disposed between the at least partially leached PCD table 802 and the cemented carbide substrate 810. However, in other embodiments, the cemented carbide portion 902 may be replaced with a metallic disc, such as a disc of iron, nickel, cobalt, or alloys thereof. The cemented carbide portion 902 may exhibit a thickness of about 0.0050 inch to about 0.100 inch, such as about 0.0050 inch to about 0.030 inch, or about 0.020 inch to about 0.025 inch. The cemented carbide substrate 810 may exhibit a thickness of about 0.30 inch to about 0.60 inch.

The cemented carbide portion 902 may comprise cobalt-cemented tungsten carbide that is substantially free of chromium carbide. The cemented carbide substrate 810 may include about 9 wt % to about 16 wt % cobalt, about 0.50 wt % to about 3.0 wt % chromium carbide grains, with the balance being substantially tungsten carbide grains. For example, the cemented carbide portion 902 may include about 13 wt % cobalt, no chromium carbide with the balance being substantially tungsten carbide grains, while the cemented carbide substrate 810 may include about 13 wt % cobalt, about 1.0 wt % chromium carbide grains with the balance being substantially tungsten carbide grains.

The assembly 900 may be HPHT processed using the HPHT process conditions previously described. During HPHT processing of the assembly 900, the cobalt from the cemented carbide portion 902 liquefies and infiltrates into the at least partially leached PCD table 802 to fill the interstitial regions thereof. As a result of cobalt being depleted from the cemented carbide portion 902, a molten cobalt-chromium alloy from the cemented carbide substrate 810 infiltrates into the depleted interstitial regions of the cemented carbide portion 902. During cooling, chromium carbide precipitates from the infiltrated cobalt-chromium alloy to increase the chromium carbide content of the cemented carbide portion 902, which is represented as the first cemented carbide portion 514 in FIG. 5.

In an embodiment, the volume of cobalt or other cementing constituent in the cemented carbide portion 902 may be chosen to infiltrate and fill substantially all or a part of the interstitial regions of the at least partially leached PCD table 802 during HPHT processing. During HPHT processing of the assembly 900, infiltration of the cementing constituent carrying chromium and/or chromium carbide from the cemented carbide substrate 810 is largely blocked. However, in some embodiments, there may be some chromium carbide present at the interface between the infiltrated PCD table and the cemented carbide portion 902, in a thin region of the infiltrated PCD table adjacent to the interface, or a relatively small amount distributed through the infiltrated PCD table due to infiltration of chromium. Because chromium was not significantly infiltrated into the at least partially leached PCD table 802 with the cementing constituent of the cemented carbide substrate 810, the infiltrated PCD table may be easily leached to a selected depth.

Figure 9B:
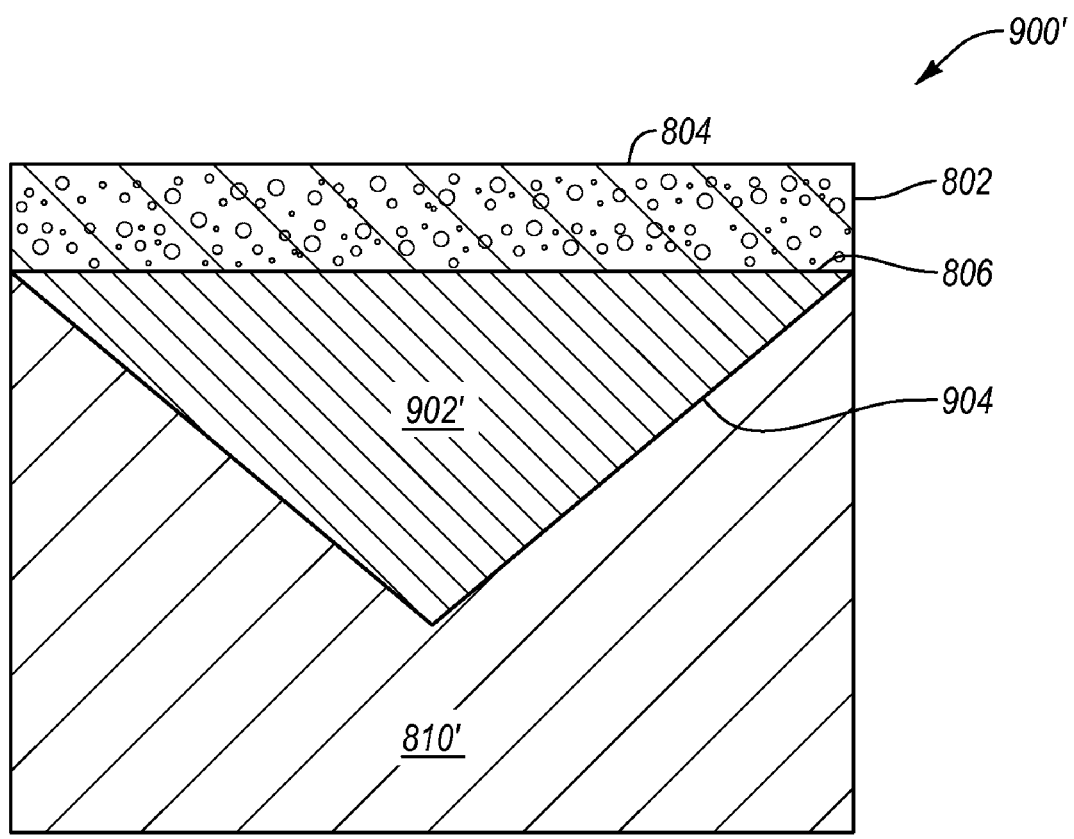
FIG. 9B is a cross-sectional view of an assembly to be HPHT processed to form the PDC shown in FIG. 6A according to yet another embodiment of method.

FIG. 9B is a cross-sectional view of an assembly 900' to be HPHT processed to form the PDC 600 shown in FIG. 6A according to yet another embodiment of a method. The assembly 900' may be formed by disposing a first cemented carbide portion 902' into a recess 904 formed in a second cemented carbide portion 810', and disposing the at least partially leached PCD table 802 adjacent to the first cemented carbide portion 902'. The first cemented carbide portion 902' may exhibit a conical geometry or other selected geometry that may be received by the correspondingly configured recess 904 formed in the second cemented carbide portion 610. The first cemented carbide portion 902' may exhibit any of the compositions disclosed for the first cemented carbide portion 902 and the second cemented carbide portion 810' may exhibit any the compositions disclosed for the second cemented carbide portion 810.

The assembly 900' may be HPHT processed using the HPHT process conditions previously described to form the PDC 600 shown in FIG. 6A. The first cemented carbide portion 902' serves the same function as the cemented carbide portion 902 (FIG. 9A), which is to provide a substantially chromium-free infiltrant of, for example, cobalt that is infiltrated into the at least partially leached PCD table 802 during HPHT processing. However, the less erosion-resistant first cemented carbide portion 902' is protected from abrasive drilling conditions (e.g., drilling mud) since a lateral periphery thereof being substantially surrounded by the second cemented carbide portion 810'. Even after HPHT processing an interface 904 between the first cemented carbide portion 902' and the second cemented carbide portion 810' may be apparent from microstructural examination. The PDC 600' shown in FIG. 6B may be formed in the same or similar manner to the PDC 600 by modifying the geometry of the first cemented carbide portion 902'.

In another embodiment, the at least partially leached PCD table 802 shown in FIGS. 9A and 9B may be replaced with another type of diamond volume such as a mass of un-sintered diamond particles (e.g., diamond powder) to be sintered. During HPHT processing, a cementing constituent from the cemented carbide portion 902 or first cemented carbide portion 902' (e.g., cobalt from a cobalt-cemented tungsten carbide substrate) may infiltrate into the diamond particles to catalyze formation of a PCD table that is integrally formed with the cemented carbide portion 902 or first cemented carbide portion 902', while infiltration of a cementing constituent carrying chromium and/or chromium carbide from the cemented carbide substrate 810 or the second cemented carbide portion 810' is largely blocked. The cementing constituent infiltrated from the cemented carbide portion 902 or first cemented carbide portion 902' may occupy the interstitial regions between the bonded diamond grains of the PCD table. Upon cooling from the HPHT process, the PCD table may be bonded to the cemented carbide portion 902 or first cemented carbide portion 902'. In an embodiment, the volume of cobalt or other cementing constituent in the cemented carbide portion 902 may be chosen to infiltrate and fill substantially all or a part of the interstitial regions of the diamond powder during HPHT processing. However, in some embodiments, there may be some chromium carbide present at the interface between the PCD table so formed and the underlying substrate, in a thin region of the PCD table so formed adjacent to the interface, or a relatively small amount distributed through the PCD table so formed due to infiltration of chromium. Because chromium was not significantly infiltrated into PCD table with the metal-solvent catalyst of the cemented carbide substrate 810 or the second cemented carbide portion 810', the infiltrated PCD table may be easily leached to a selected depth.

Figure 10A:
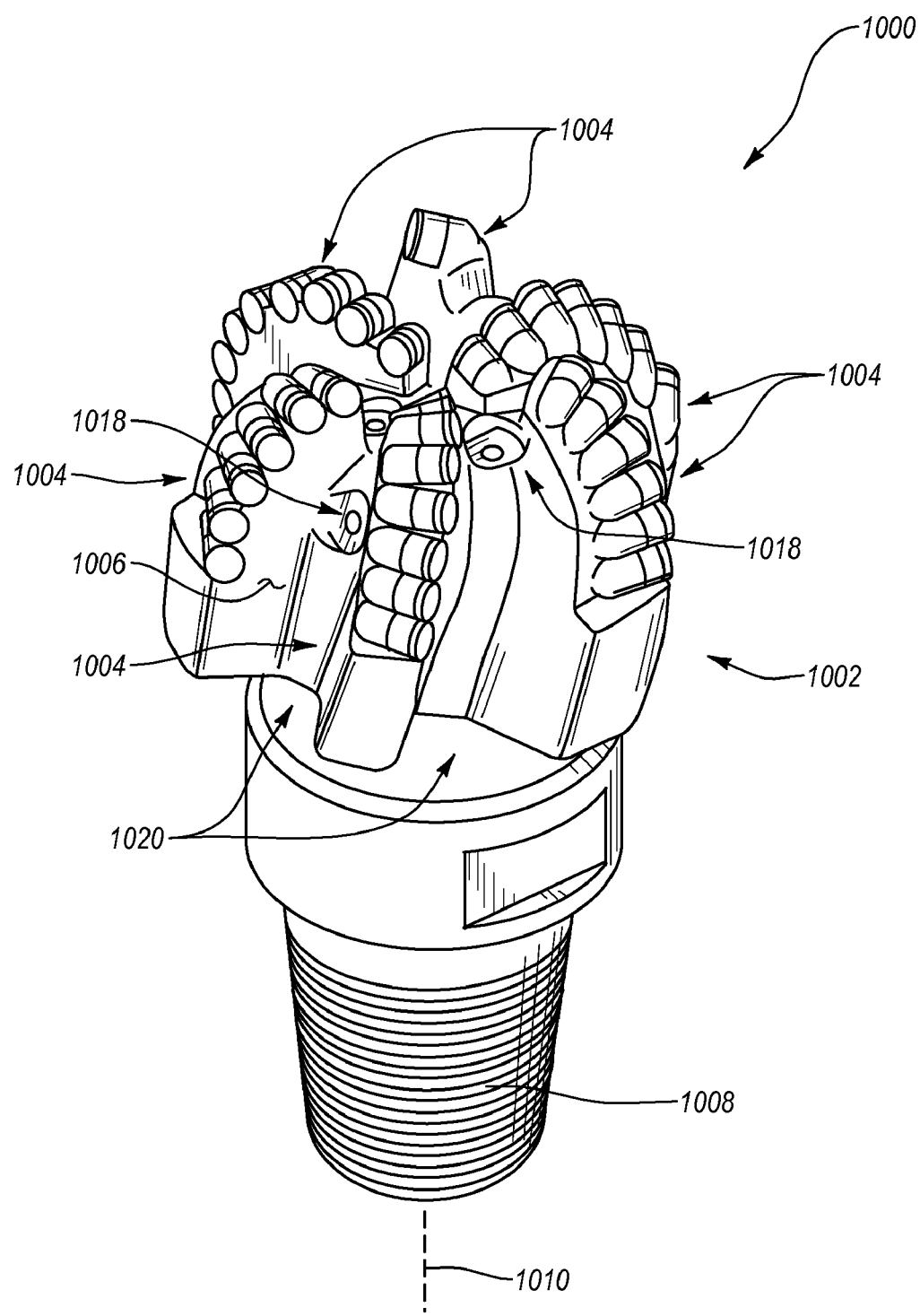
FIG. 10A is an isometric view of an embodiment of a rotary drill bit that may employ one or more of the disclosed PDC embodiments.
Figure 10B:
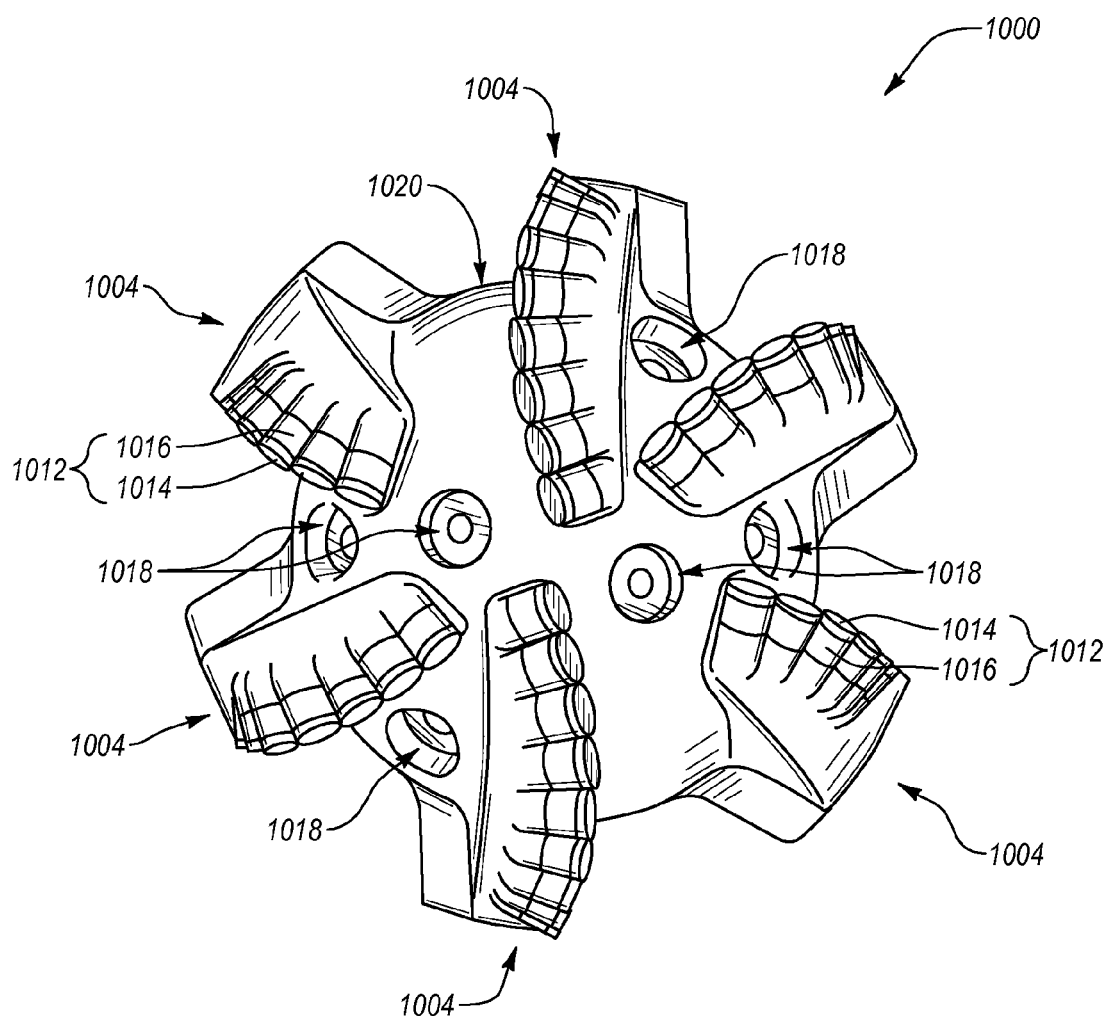
FIG. 10B is a top elevation view of the rotary drill bit shown in FIG. 10A.

FIG. 10A is an isometric view and FIG. 10B is a top elevation view of an embodiment of a rotary drill bit 1000. The rotary drill bit 1000 includes at least one PDC configured according to any of the previously described PDC embodiments, such as the PDC 100 of FIGS. 1A and 1B. The rotary drill bit 1000 comprises a bit body 1002 that includes radially- and longitudinally-extending blades 1004 having leading faces 1006, and a threaded pin connection 1008 for connecting the bit body 1002 to a drilling string. The bit body 1002 defines a leading end structure for drilling into a subterranean formation by rotation about a longitudinal axis 1010 and application of weight-on-bit. At least one PDC, configured according to any of the previously described PDC embodiments, may be affixed to the bit body 1002. With reference to FIG. 10B, a plurality of PDCs 1012 are secured to the blades 1004 of the bit body 1002 (FIG. 10A). For example, each PDC 1012 may include a PCD table 1014 bonded to a substrate 1016. More generally, the PDCs 1012 may comprise any PDC disclosed herein, without limitation. In addition, if desired, in some embodiments, a number of the PDCs 1012 may be conventional in construction. Also, circumferentially adjacent blades 1004 define so-called junk slots 1020 therebetween. Additionally, the rotary drill bit 1000 includes a plurality of nozzle cavities 1018 for communicating drilling fluid from the interior of the rotary drill bit 1000 to the PDCs 1012.

FIGS. 10A and 10B merely depict one embodiment of a rotary drill bit that employs at least one PDC fabricated and structured in accordance with the disclosed embodiments, without limitation. The rotary drill bit 1000 is used to represent any number of earth-boring tools or drilling tools, including, for example, core bits, roller-cone bits, fixed-cutter bits, eccentric bits, bicenter bits, reamers, reamer wings, or any other downhole tool including superabrasive compacts, without limitation.

The PDCs disclosed herein (e.g., the PDC 100 shown in FIGS. 1A and 1B) may also be utilized in applications other than cutting technology. For example, the disclosed PDC embodiments may be used in wire dies, bearings, artificial joints, inserts, cutting elements, and heat sinks. Thus, any of the PDCs disclosed herein may be employed in an article of manufacture including at least one superabrasive element or compact.

Thus, the embodiments of PDCs disclosed herein may be used on any apparatus or structure in which at least one conventional PDC is typically used. In one embodiment, a rotor and a stator, assembled to form a thrust-bearing apparatus, may each include one or more PDCs (e.g., the PDC 100 shown in FIGS. 1A and 1B) configured according to any of the embodiments disclosed herein and may be operably assembled to a downhole drilling assembly. U.S. Pat. Nos. 4,410,054; 4,560,014; 5,364,192; 5,368,398; and 5,480,233, the disclosure of each of which is incorporated herein, in its entirety, by this reference, disclose subterranean drilling systems within which bearing apparatuses utilizing superabrasive compacts disclosed herein may be incorporated. The embodiments of PDCs disclosed herein may also form all or part of heat sinks, wire dies, bearing elements, cutting elements, cutting inserts (e.g., on a roller-cone-type drill bit), machining inserts, or any other article of manufacture as known in the art. Other examples of articles of manufacture that may use any of the PDCs disclosed herein are disclosed in U.S. Pat. Nos. 4,811,801; 4,268,276; 4,468,138; 4,738,322; 4,913,247; 5,016,718; 5,092,687; 5,120,327; 5,135,061; 5,154,245; 5,460,233; 5,544,713; 5,180,022; and 6,793,681, the disclosure of each of which is incorporated herein, in its entirety, by this reference.

The following working examples provide further detail in connection with the specific embodiments described above. Comparative working examples 1, 2, 4, 5, 7, 10-12, 19, 20 are compared to working examples 3, 6, 8, 9, 13-18, 21 fabricated according to specific embodiments of the invention.

COMPARATIVE WORKING EXAMPLE 1

One PDC was formed according to the following process. A mass of diamond particles having an average particle size of about 19 μm was disposed on a cobalt-cemented tungsten carbide substrate. The mass of diamond particles and the cobalt-cemented tungsten carbide substrate were HPHT processed in a high-pressure cubic press at a temperature of about 1400° C. and a pressure of about 5 GPa to about 7 GPa to form a PDC comprising a PCD table integrally formed and bonded to the cobalt-cemented tungsten carbide substrate. The PCD table exhibited a thickness of about 0.07155 inch and a chamfer exhibiting a length of 0.0118 inch at an angle of about 45° with respect to a top surface of the PCD table was machined therein.

Figure 11:
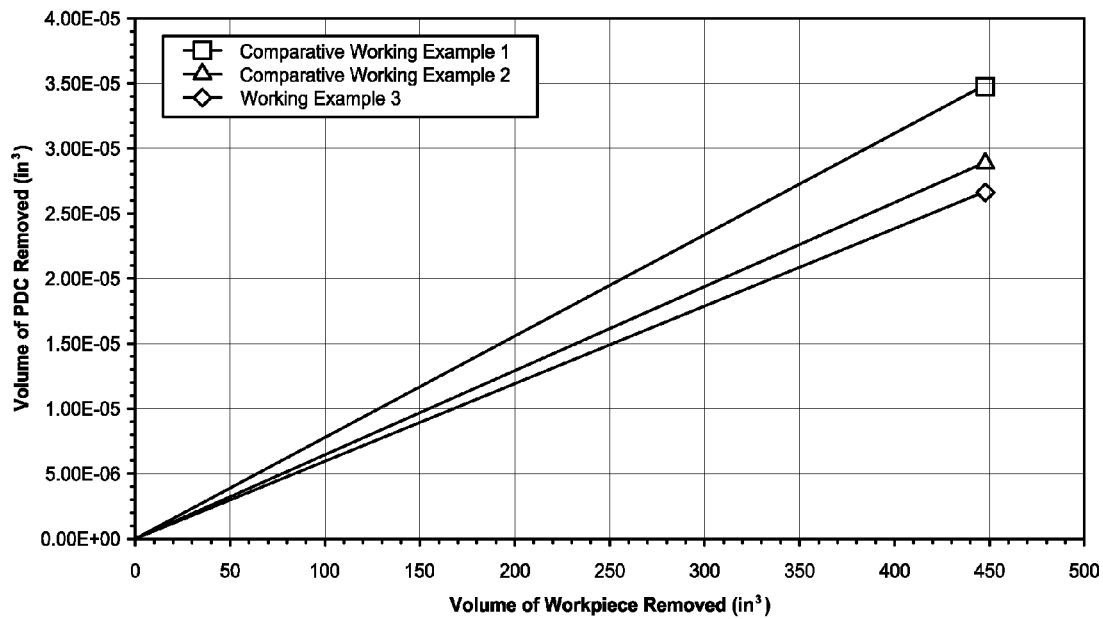
FIG. 11 is a graph of volume of PDC removed versus volume of workpiece removed for comparative working examples 1 and 2, and working example 3 according to an embodiment of the invention.

The abrasion resistance of the conventional PDC of comparative working example 1 was evaluated by measuring the volume of PDC removed versus the volume of Barre granite workpiece removed, while the workpiece was cooled with water. The test parameters were a depth of cut for the PDC of about 0.254 mm, a back rake angle for the PDC of about 20 degrees, an in-feed for the PDC of about 6.35 mm/rev, and a rotary speed of the workpiece to be cut of about 101 RPM. FIG. 11 shows the abrasion resistance test results for the PDC of comparative working example 1.

The thermal stability of the PCD table of the conventional PDC of comparative working example 1 was also evaluated by measuring the distance cut in a Barre granite workpiece prior to failure, without using coolant, in a vertical turret lathe test. The distance cut is considered representative of the thermal stability of the PCD table. The test parameters were a depth of cut for the PDC of about 1.27 mm, a back rake angle for the PDC of about 20 degrees, an in-feed for the PDC of about 1.524 mm/rev, and a cutting speed of the workpiece to be cut of about 1.78 msec. The conventional PDC of comparative working example 1 was able to cut a distance of about 1893 linear feet in the workpiece prior to failure.

COMPARATIVE WORKING EXAMPLE 2

One PDC was formed according to the process described for comparative working example 1. The PCD table exhibited a thickness of about 0.089 inch and a chamfer exhibiting a length of 0.0118 inch at an angle of about 45° with respect to a top surface of the PCD table was machined therein. The PCD table was leached to a depth of about 92 μm.

The abrasion resistance of the conventional PDC of working example 2 was evaluated by measuring the volume of PDC removed versus the volume of Barre granite workpiece removed, while the workpiece was cooled with water, using the same workpiece and the same test parameters as comparative working example 1. As shown in FIG. 11, the abrasion resistance of the PDC of working example 2 was greater than that of the PDC of comparative working example 1. The thermal stability of the conventional PCD table of working example 2 was also evaluated by measuring the distance cut in a Barre granite workpiece prior to failure, without using coolant, using the same workpiece and the same test parameters as comparative working example 1.

The PCD table of the PDC of working example 2 was able to cut a distance of about 2511 linear feet in the workpiece prior to failure.

WORKING EXAMPLE 3

One PDC was formed according to the following process. A mass of diamond particles having an average particle size of about 19 μm was disposed on a cemented carbide substrate. The cemented carbide substrate was composed of about 13 wt % cobalt as a cementing constituent, about 2 wt % tantalum carbide, and about 85 wt % tungsten carbide. The mass of diamond particles and the cemented carbide substrate were HPHT processed in a high-pressure cubic press at a temperature of about 1400° C. and a pressure of about 5 GPa to about 7 GPa to form a PDC comprising a PCD table integrally formed and bonded to the cemented carbide substrate. The PCD table exhibited a thickness of about 0.0686 inch and a chamfer exhibiting a length of 0.0125 inch at an angle of about 45° with respect to a top surface of the PCD table was machined therein.

The abrasion resistance of the PDC of working example 3 was evaluated by measuring the volume of PDC removed versus the volume of Barre granite workpiece removed, while the workpiece was cooled with water, using the same workpiece and the same test parameters as comparative working example 1. As shown in FIG. 11, the abrasion resistance of the PDC of working example 3 was greater than that of the PDCs of comparative working examples 1 and 2. The thermal stability of the PCD table of working example 3 was also evaluated by measuring the distance cut in a Barre granite workpiece prior to failure, without using coolant, using the same workpiece and the same test parameters as comparative working example 1. The PCD table of the PDC of working example 3 was able to cut a distance of about 1059 linear feet in the workpiece prior to failure.

COMPARATIVE WORKING EXAMPLE 4

One PDC was formed according to the process described for comparative working example 1. The PCD table exhibited a thickness of about 0.067 inch and a chamfer exhibiting a length of 0.0117 inch at an angle of about 45° with respect to a top surface of the PCD table was machined therein.

Figure 12:
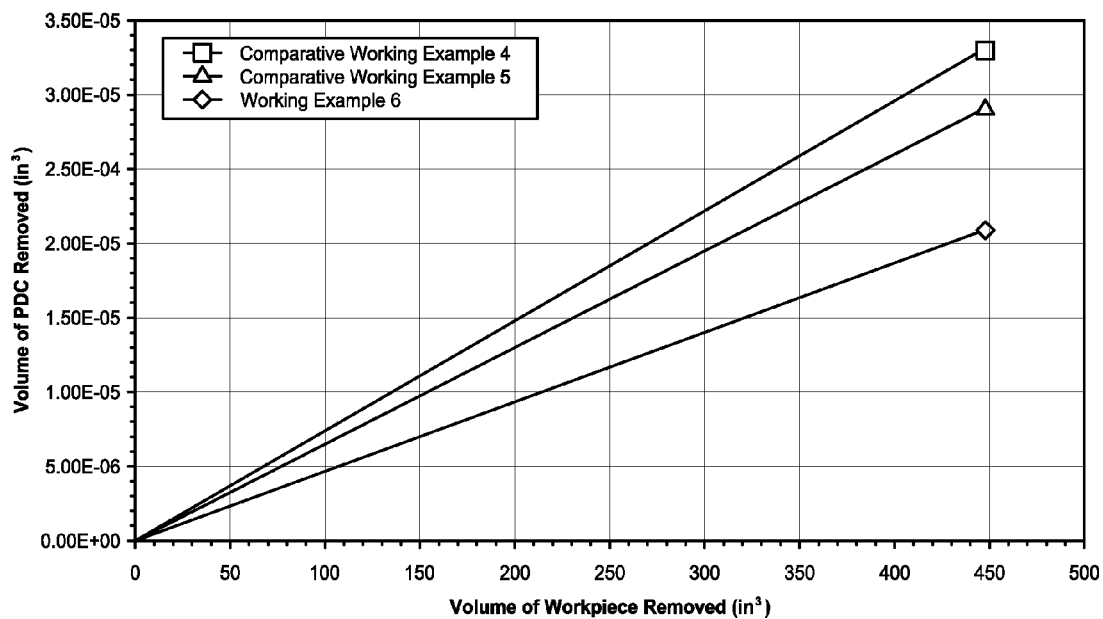
FIG. 12 is a graph of volume of PDC removed versus volume of workpiece removed for comparative working examples 4 and 5, and working example 6 according to an embodiment of the invention.

The abrasion resistance of the conventional PDC of comparative working example 4 was evaluated by measuring the volume of PDC removed versus the volume of Barre granite workpiece removed, while the workpiece was cooled with water. The test parameters were the same as used for comparative working example 1. FIG. 12 shows the abrasion resistance test results for the PDC of comparative working example 4.

The thermal stability of the conventional PCD table of the conventional PDC of comparative working example 4 was also evaluated by measuring the distance cut in a Barre granite workpiece prior to failure, without using coolant, in a vertical turret lathe test. The test parameters were the same as used for comparative working example 1. The conventional PDC of comparative working example 4 was able to cut a distance of about 2511 linear feet in the workpiece prior to failure.

COMPARATIVE WORKING EXAMPLE 5

One PDC was formed according to the process described for comparative working example 1. The PCD table exhibited a thickness of about 0.089 inch and a chamfer exhibiting a length of 0.0118 inch at an angle of about 45° with respect to a top surface of the PCD table was machined therein. The PCD table was leached to a depth of about 92 μm.

The abrasion resistance of the conventional PDC of comparative working example 5 was evaluated by measuring the volume of PDC removed versus the volume of Barre granite workpiece removed, while the workpiece was cooled with water, using the same workpiece as comparative working example 4. The test parameters were the same as used for comparative working example 1. FIG. 12 shows the abrasion resistance test results for the PDC of comparative working example 5.

The thermal stability of the PCD table of the conventional PDC of comparative working example 5 was also evaluated by measuring the distance cut in a Barre granite workpiece prior to failure, without using coolant, in a vertical turret lathe test using the same workpiece as comparative working example 4. The test parameters were the same as used for comparative working example 1. The conventional PDC of comparative working example 5 was able to cut a distance of about 2511 linear feet in the workpiece prior to failure.

WORKING EXAMPLE 6

One PDC was formed according to the following process. A mass of diamond particles having an average particle size of about 19 μm was disposed on a cemented carbide substrate. The cemented carbide substrate was composed of about 13 wt % cobalt as a cementing constituent, about 1 wt % chromium carbide, and about 86 wt % tungsten carbide. The mass of diamond particles and the cemented carbide substrate were HPHT processed in a high-pressure cubic press at a temperature of about 1400° C. and a pressure of about 5 GPa to about 7 GPa to form a PDC comprising a PCD table integrally formed and bonded to the cemented carbide substrate. The PCD table exhibited a thickness of about 0.069 inch and a chamfer exhibiting a length of 0.012 inch at an angle of about 45° with respect to a top surface of the PCD table was machined therein.

The abrasion resistance of the PDC of working example 6 was evaluated by measuring the volume of PDC removed versus the volume of Barre granite workpiece removed, while the workpiece was cooled with water, using the same workpiece and the same test parameters as comparative working example 4. As shown in FIG. 12, the abrasion resistance of the PDC of working example 6 was greater than that of the PDCs of comparative working examples 4 and 5. The thermal stability of the PCD table of working example 6 was also evaluated by measuring the distance cut in a Barre granite workpiece prior to failure, without using coolant, using the same workpiece and the same test parameters as comparative working example 4. The PCD table of the PDC of working example 3 was able to cut a distance of about 812 linear feet in the workpiece prior to failure.

COMPARATIVE WORKING EXAMPLE 7

One PDC was formed according to the process described for comparative working example 1. The PCD table exhibited a thickness of about 0.0866 inch and a chamfer exhibiting a length of 0.0133 inch at an angle of about 45° with respect to a top surface of the PCD table was machined therein. The PCD table was leached to a depth of about 99 μm.

Figure 13:
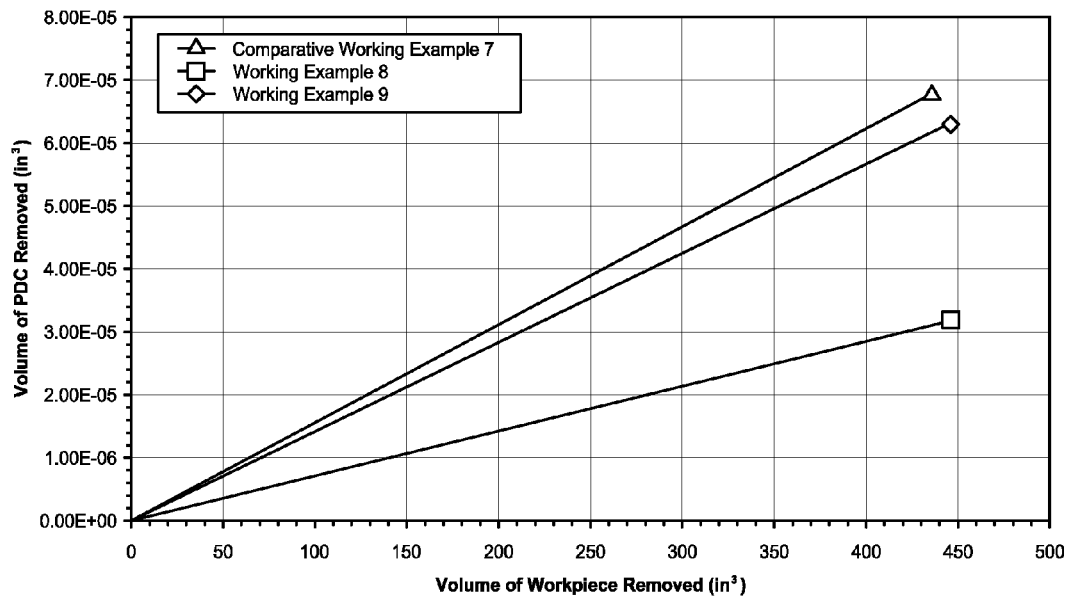
FIG. 13 is a graph of volume of PDC removed versus volume of workpiece removed for comparative working example 7 and working examples 8 and 9 according to embodiments of the invention.

The abrasion resistance of the PDC of comparative working example 7 was evaluated by measuring the volume of PDC removed versus the volume of Barre granite workpiece removed, while the workpiece was cooled with water. The test parameters were the same as used for comparative working example 1. FIG. 13 shows the abrasion resistance test results for the PDC of comparative working example 7.

The thermal stability of the PCD table of the conventional PDC of comparative working example 7 was also evaluated by measuring the distance cut in a Barre granite workpiece prior to failure, without using coolant, in a vertical turret lathe test. The test parameters were the same as used for comparative working example 1. The conventional PDC of comparative working example 7 was able to cut a distance of about 1568 linear feet in the workpiece prior to failure.

WORKING EXAMPLE 8

One PDC was formed according to the process described for working example 3 with a tantalum-carbide-containing cemented carbide substrate. The PCD table exhibited a thickness of about 0.0775 inch and a chamfer exhibiting a length of 0.0115 inch at an angle of about 45° with respect to a top surface of the PCD table was machined therein. The PCD table was leached to a depth of between about 39 μm to about 67 μm as measured in an SEM.

The abrasion resistance of the PDC of working example 8 was evaluated by measuring the volume of PDC removed versus the volume of Barre granite workpiece removed, while the workpiece was cooled with water, using the same workpiece and the same test parameters as comparative working example 7. As shown in FIG. 13, the abrasion resistance of the PDC of working example 8 was greater than that of comparative working example 7. The thermal stability of the PCD table of working example 8 was also evaluated by measuring the distance cut in a Barre granite workpiece prior to failure, without using coolant, using the same workpiece and the same test parameters as comparative working example 7. The PCD table of the PDC of working example 8 was able to cut a distance of about 2344 linear feet in the workpiece prior to failure, which is greater than the distance cut by comparative working example 7. Thus, despite a relatively shallow leaching compared to comparative working example 7, the PCD table of the PDC of working example 8 was able to outperform the PCD table of comparative working example 7 in both abrasion and thermal-stability tests.

WORKING EXAMPLE 9

One PDC was formed according to the process described for working example 6 with chromium-carbide-containing cemented carbide substrate. The PCD table exhibited a thickness of about 0.0750 inch and a chamfer exhibiting a length of 0.0108 inch at an angle of about 45° with respect to a top surface of the PCD table was machined therein. The PCD table was leached to a depth of between about 15 μm to about 37 μm as measured in a SEM.

The abrasion resistance of the PDC of working example 9 was evaluated by measuring the volume of PDC removed versus the volume of Barre granite workpiece removed, while the workpiece was cooled with water, using the same workpiece and the same test parameters as comparative working example 7. As shown in FIG. 13, the abrasion resistance of the PDC of working example 9 was greater than that of comparative working example 7, but less than that of working example 8. The thermal stability of the PCD table of working example 9 was also evaluated by measuring the distance cut in a Barre granite workpiece prior to failure, without using coolant, using the same workpiece and the same test parameters as comparative working example 7. The PCD table of the PDC of working example 9 was able to cut a distance of about 2414 linear feet in the workpiece prior to failure, which is greater than the distance cut by comparative working example 7 and working example 8. Thus, despite a relatively lower leaching depth compared to comparative working example 7, the PCD table of the PDC of working example 9 was able to outperform the PCD table of comparative working example 7 in both abrasion and thermal-stability tests.

COMPARATIVE WORKING EXAMPLE 10

First and second PDCs were formed according to the process described for comparative working example 1. The PCD table of the first PDC exhibited a thickness of about 0.065 inch and a chamfer exhibiting a length of 0.0112 inch at an angle of about 45° with respect to a top surface of the PCD table was machined therein. The PCD table of the second PDC exhibited a thickness of about 0.063 inch and a chamfer exhibiting a length of 0.0111 inch at an angle of about 45° with respect to the top surface of the PCD table was machined therein.

Figure 14:
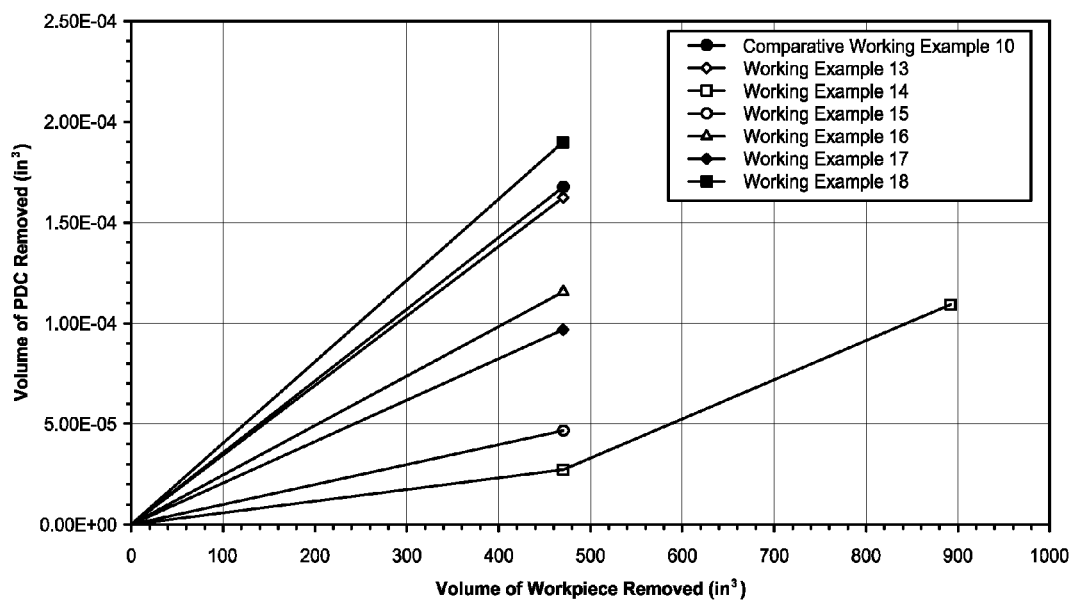
FIG. 14 is a graph of volume of PDC removed versus volume of workpiece removed for comparative working example 10 and working examples 13-18 according to embodiments of the invention.

The abrasion resistance of the conventional first PDC of comparative working example 10 was evaluated by measuring the volume of PDC removed versus the volume of Barre granite workpiece removed, while the workpiece was cooled with water. The test parameters were the same as used for comparative working example 1. FIG. 14 shows the abrasion resistance test results for the conventional first PDC of comparative working example 10.

The thermal stability of the PCD table of the conventional second PDC of comparative working example 10 was also evaluated by measuring the distance cut in a Barre granite workpiece prior to failure, without using coolant, in a vertical turret lathe test. The test parameters were the same as used for comparative working example 1. The PCD table of the conventional second PDC of comparative working example 10 was able to cut a distance of about 1769 linear feet in the workpiece prior to failure.

COMPARATIVE WORKING EXAMPLE 11

A PDC was formed according to the process described for comparative working example 1. The PCD table exhibited a thickness of about 0.090 inch and a chamfer exhibiting a length of 0.0126 inch at an angle of about 45° with respect to a top surface of the PCD table was machined therein.

The thermal stability of the PCD table of the conventional PDC of comparative working example 11 was also evaluated by measuring the distance cut in a Barre granite workpiece prior to failure, without using coolant, in a vertical turret lathe test using the same workpiece and test parameters as comparative working example 10. The conventional PDC of comparative working example 11 was able to cut a distance of about 745 linear feet in the workpiece prior to failure.

COMPARATIVE WORKING EXAMPLE 12

A PDC was formed according to the process described for comparative working example 1. The PCD table exhibited a thickness of about 0.077 inch and a chamfer exhibiting a length of 0.0101 inch at an angle of about 45° with respect to a top surface of the PCD table was machined therein. The PCD table was leached to a depth of about 89 μm.

The thermal stability of the PCD table of the conventional PDC of comparative working example 12 was also evaluated by measuring the distance cut in a Barre granite workpiece prior to failure, without using coolant, in a vertical turret lathe test using the same workpiece and test parameters as comparative working example 10. The conventional PDC of comparative working example 12 was able to cut a distance of about 2354 linear feet in the workpiece prior to failure.

WORKING EXAMPLE 13

First and second PDCs were formed according to the following process. A mixture of 96 wt % diamond particles having an average particle size of about 19 μm and 4 wt % tantalum carbide was formed. The mixture was disposed on a cobalt-cemented tungsten carbide substrate having a composition of 13 wt % cobalt and 87 wt % tungsten carbide. The mixture and the cobalt-cemented tungsten carbide substrate were HPHT processed in a high-pressure cubic press at a temperature of about 1400° C. and a pressure of about 5 GPa to about 7 GPa to form a PDC comprising a PCD table integrally formed and bonded to the cobalt-cemented tungsten carbide substrate. The PCD table of the first PDC exhibited a thickness of about 0.077 inch and a chamfer exhibiting a length of 0.0109 inch at an angle of about 45° with respect to a top surface of the PCD table was machined therein. The PCD table of the second PDC exhibited a thickness of about 0.065 inch and a chamfer exhibiting a length of 0.0128 inch at an angle of about 45° with respect to a top surface of the PCD table was machined therein.

The abrasion resistance of the first PDC of working example 13 was evaluated by measuring the volume of PDC removed versus the volume of Barre granite workpiece removed, while the workpiece was cooled with water, using the same workpiece and the same test parameters as comparative working example 10. As shown in FIG. 14, the abrasion resistance of the first PDC of working example 13 was approximately the same as that of comparative working example 10. The thermal stability of the PCD table of the second PDC of working example 13 was also evaluated by measuring the distance cut in a Barre granite workpiece prior to failure, without using coolant, using the same workpiece and test parameters as comparative working example 10. The PCD table of the second PDC of working example 13 was able to cut a distance of about 3056 linear feet in the workpiece prior to failure, which is significantly greater than the distance cut by comparative working examples 10-12. Thus, despite not being leached, the PCD table of the second PDC of working example 13 was more thermally stable than that of the PCD table of comparative working example 12.

WORKING EXAMPLE 14

First and second PDCs were formed according to the process described for working example 13. The PCD table of the first PDC exhibited a thickness of about 0.083 inch, a chamfer exhibiting a length of 0.0138 inch at an angle of about 45° with respect to a top surface of the PCD table was machined therein, and the PCD table was leached. The PCD table of the second PDC exhibited a thickness of about 0.076 inch, a chamfer exhibiting a length of 0.0131 inch at an angle of about 45° with respect to a top surface of the PCD table was machined therein, and the PCD table was leached.

The abrasion resistance of the PDC of working example 14 was evaluated by measuring the volume of PDC removed versus the volume of Barre granite workpiece removed, while the workpiece was cooled with water, using the same workpiece and the same test parameters as comparative working example 10. As shown in FIG. 14, the abrasion resistance of the first PDC of working example 14 was significantly greater than that of comparative working example 10 and working example 13. The thermal stability of the PCD table of the second PDC of working example 14 was also evaluated by measuring the distance cut in a Barre granite workpiece prior to failure, without using coolant, using the same workpiece and test parameters as comparative working example 10. The PCD table of the second PDC of working example 14 was able to cut a distance of about 3269 linear feet in the workpiece prior to failure, which is significantly greater than the distance cut by comparative working examples 10-12.

WORKING EXAMPLE 15

First and second PDCs were formed according to the following process. A mixture of 96 wt % diamond particles having an average particle size of about 19 μm and 4 wt % chromium carbide was formed. The mixture was disposed on a cobalt-cemented tungsten carbide substrate having a composition of 13 wt % cobalt and 87 wt % tungsten carbide. The mixture and the cobalt-cemented tungsten carbide substrate were HPHT processed in a high-pressure cubic press at a temperature of about 1400° C. and a pressure of about 5 GPa to about 7 GPa to form a PDC comprising a PCD table integrally formed and bonded to the cobalt-cemented tungsten carbide substrate. The PCD table of the first PDC exhibited a thickness of about 0.076 inch and a chamfer exhibiting a length of 0.014 inch at an angle of about 45° with respect to a top surface of the PCD table was machined therein. The PCD table of the second PDC exhibited a thickness of about 0.075 inch and a chamfer exhibiting a length of 0.0123 inch at an angle of about 45° with respect to a top surface of the PCD table was machined therein.

The abrasion resistance of the PDC of working example 15 was evaluated by measuring the volume of PDC removed versus the volume of Barre granite workpiece removed, while the workpiece was cooled with water, using the same workpiece and the same test parameters as comparative working example 10. As shown in FIG. 14, the abrasion resistance of the first PDC of working example 15 was significantly greater than that of comparative working example 10 and working example 13. The thermal stability of the PCD table of the second PDC of working example 14 was also evaluated by measuring the distance cut in a Barre granite workpiece prior to failure, without using coolant, using the same workpiece and the same test parameters as comparative working example 10. The PCD table of the second PDC of working example 15 was able to cut a distance of about 1154 linear feet in the workpiece prior to failure, which is greater than the distance cut by comparative working example 11.

WORKING EXAMPLE 16

First and second PDCs were formed according to the process described for working example 15. The PCD table of the first PDC exhibited a thickness of about 0.078 inch, a chamfer exhibiting a length of 0.014 inch at an angle of about 45° with respect to a top surface of the PCD table was machined therein, and the PCD table was leached. The PCD table of the second PDC exhibited a thickness of about 0.074 inch, a chamfer exhibiting a length of 0.013 inch at an angle of about 45° with respect to a top surface of the PCD table was machined therein, and the PCD table was leached.

The abrasion resistance of the first PDC of working example 16 was evaluated by measuring the volume of PDC removed versus the volume of Barre granite workpiece removed, while the workpiece was cooled with water, using the same workpiece and the same test parameters as comparative working example 10. As shown in FIG. 14, the abrasion resistance of the first PDC of working example 16 was significantly greater than that of comparative working example 10 and working example 13. The thermal stability of the PCD table of the second PDC of working example 16 was also evaluated by measuring the distance cut in a Barre granite workpiece prior to failure, without using coolant, using the same workpiece and the same test parameters as comparative working example 10. The PCD table of the second PDC of working example 16 was able to cut a distance of about 2501 linear feet in the workpiece prior to failure, which is greater than the distance cut by comparative working examples 10-12, and working example 15.

WORKING EXAMPLE 17

First and second PDCs were formed according to the following process. A mixture of 84 wt % diamond particles having an average particle size of about 19 μm, 4 wt % chromium carbide, and 12 wt % tantalum carbide was formed. The mixture was disposed on a cobalt-cemented tungsten carbide substrate having a composition of 13 wt % cobalt and 87 wt % tungsten carbide. The mixture and the cobalt-cemented tungsten carbide substrate were HPHT processed in a high-pressure cubic press at a temperature of about 1400° C. and a pressure of about 5 GPa to about 7 GPa to form a PDC comprising a PCD table integrally formed and bonded to the cobalt-cemented tungsten carbide substrate. The PCD table of the first PDC exhibited a thickness of about 0.074 inch and a chamfer exhibiting a length of 0.0121 inch at an angle of about 45° with respect to a top surface of the PCD table was machined therein. The PCD table of the second PDC exhibited a thickness of about 0.066 inch and a chamfer exhibiting a length of 0.0126 inch at an angle of about 45° with respect to a top surface of the PCD table was machined therein.

The abrasion resistance of the first PDC of working example 17 was evaluated by measuring the volume of PDC removed versus the volume of Barre granite workpiece removed, while the workpiece was cooled with water, using the same workpiece and the same test parameters as comparative working example 10. As shown in FIG. 14, the abrasion resistance of the first PDC of working example 17 was greater than that of comparative working examples 10 and working examples 13, 16, and 18. The thermal stability of the PCD table of the second PDC of working example 17 was also evaluated by measuring the distance cut in a Barre granite workpiece prior to failure, without using coolant, using the same workpiece and the same test parameters as comparative working example 10. The PCD table of the second PDC of working example 17 was able to cut a distance of about 1889 linear feet in the workpiece prior to failure, which is greater than the distance cut by comparative working examples 10-11, and working example 15.

WORKING EXAMPLE 18

First and second PDCs were formed according to the process described for working example 17. The PCD table of the first PDC exhibited a thickness of about 0.063 inch, a chamfer exhibiting a length of 0.0133 inch at an angle of about 45° with respect to a top surface of the PCD table was machined therein, and the PCD table was leached. The PCD table of the second PDC exhibited a thickness of about 0.062 inch, a chamfer exhibiting a length of 0.0126 inch at an angle of about 45° with respect to a top surface of the PCD table was machined therein, and the PCD table was leached.

The abrasion resistance of the PDC of working example 18 was evaluated by measuring the volume of the PDC removed versus the volume of Barre granite workpiece removed, while the workpiece was cooled with water, using the same workpiece and the same test parameters as comparative working example 10. As shown in FIG. 14, the abrasion resistance of the first PDC of working example 18 was the least wear resistant of all of the comparative working examples and working examples. It is currently believed by the inventors that some of the chromium carbide and tantalum carbide particles were removed by the leaching process, and this contributed to the low abrasion resistance of the first PDC. The thermal stability of the PCD table of the second PDC of working example 18 was also evaluated by measuring the distance cut in a Barre granite workpiece prior to failure, without using coolant, using the same workpiece and the same test parameters as comparative working example 10. The PCD table of the second PDC of working example 18 was able to cut a distance of about 1879 linear feet in the workpiece prior to failure, which is greater than the distance cut by comparative working examples 10-11, and working example 15.

COMPARATIVE WORKING EXAMPLE 19

First and second PDCs were formed according to the process described for comparative working example 1. The first PDC had a PCD table that exhibited a thickness of about 0.0907 inch and a chamfer exhibiting a length of 0.0138 inch at an angle of about 45° with respect to a top surface of the PCD table was machined therein. The second PDC had a PCD table that exhibited a thickness of about 0.0921 inch and a chamfer exhibiting a length of 0.0124 inch at an angle of about 45° with respect to a top surface of the PCD table was machined therein.

Figure 15:
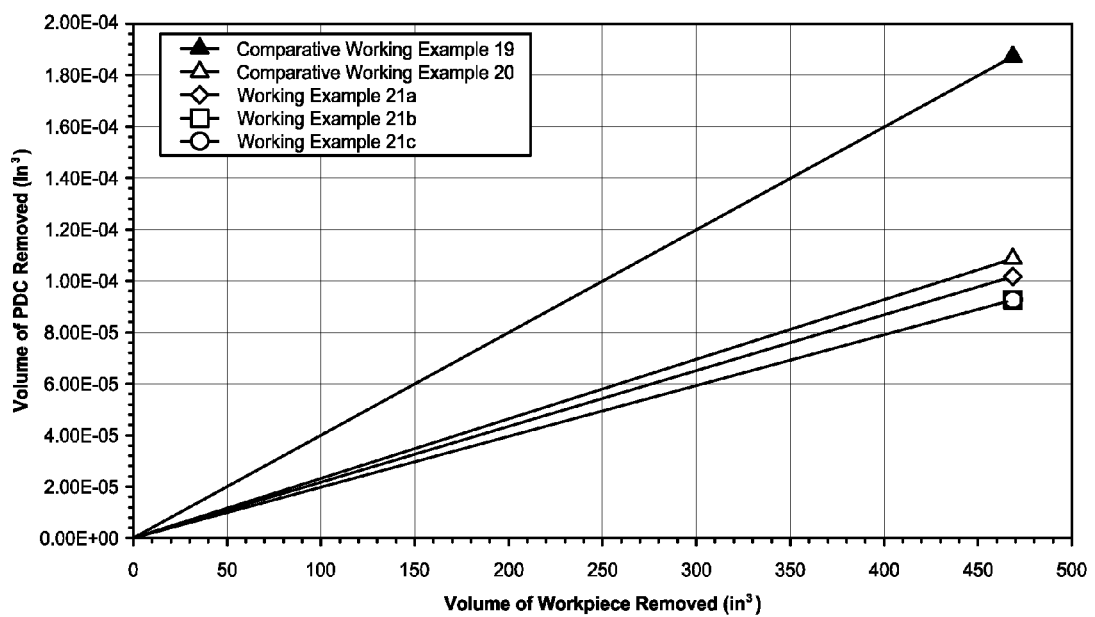
FIG. 15 is a graph of volume of PDC removed versus volume of workpiece removed for comparative working examples 19 and 20 and working example 21 according to an embodiment of the invention.

The abrasion resistance of the first PDC of comparative working example 19 was evaluated by measuring the volume of PDC removed versus the volume of Barre granite workpiece removed, while the workpiece was cooled with water, using the same test parameters as comparative working example 1. FIG. 15 shows the abrasion resistance test results for the first PDC of comparative working example 19. The thermal stability of the PCD table the second PDC of comparative working example 19 was also evaluated by measuring the distance cut in a Barre granite workpiece prior to failure, without using coolant, using the same test parameters as comparative working example 1. The PCD table of the second PDC of comparative working example 19 was able to cut a distance of about 1600 linear feet in the workpiece prior to failure.

COMPARATIVE WORKING EXAMPLE 20

First and second PDCs were formed according to the process described for comparative working example 1. The first PDC had a PCD table that exhibited a thickness of about 0.0809 inch and a chamfer exhibiting a length of 0.0123 inch at an angle of about 45° with respect to a top surface of the PCD table was machined therein. The second PDC had a PCD table that exhibited a thickness of about 0.0923 inch and a chamfer exhibiting a length of 0.0115 inch at an angle of about 45° with respect to a top surface of the PCD table was machined therein. The PCD tables of the first and second PDCs were leached to a depth of about 71 μm.

The abrasion resistance of the first PDC of comparative working example 20 was evaluated by measuring the volume of PDC removed versus the volume of Barre granite workpiece removed, while the workpiece was cooled with water, using the same workpiece and same test parameters as comparative working example 19. FIG. 15 shows the abrasion resistance test results for the first PDC of comparative working example 20. The thermal stability of the PCD table of the second PDC of comparative working example 20 was also evaluated by measuring the distance cut in a Barre granite workpiece prior to failure, without using coolant, using the same workpiece and same test parameters as comparative working example 19. The PCD table of the second PDC of comparative working example 20 was able to cut a distance of about 3000 linear feet in the workpiece prior to failure.

WORKING EXAMPLE 21

Three PDCs were formed according to the following process. A PCD table was formed by HPHT sintering, in the presence of cobalt, diamond particles having an average grain size of about 19 μm. The PCD table included bonded diamond grains, with cobalt disposed within interstitial regions between the bonded diamond grains. The PCD table was leached with an acid for a time sufficient to remove substantially all of the cobalt from the interstitial regions to form an at least partially leached PCD table. An assembly was formed by disposing a cobalt-cemented tungsten carbide disk between a cemented carbide substrate and the at least partially leached PCD table. The cobalt-cemented tungsten carbide disk had a composition of about 13 wt % cobalt and 87 wt % tungsten carbide (no chromium carbide) and a thickness of about 0.020 inch. The cemented carbide substrate had a composition of about 13 wt % cobalt, about 1 wt % chromium carbide, and about 86 wt % tungsten carbide. The assembly was HPHT processed in a high-pressure cubic press at a temperature of about 1400° C. and a pressure of about 5 GPa to about 7 GPa to form a PDC comprising an infiltrated PCD table bonded to a substrate. The substrate was formed from the precursor cobalt-cemented tungsten carbide disk and the precursor cemented carbide substrate.

Scanning electron microscopy showed that the at least partially leached PCD table of each PDC was well infiltrated with cobalt. Energy dispersive spectroscopy performed in the SEM showed that the PCD tables had a relatively small amount of chromium infiltrated therein from the cemented carbide substrate compared to the underlying substrate. The top surface of the infiltrated PCD table remote from the substrate had about 0.13 wt % chromium and the interface between the infiltrated PCD table and the substrate had about 0.16 wt %.

The abrasion resistance of each of the three PDCs of working example 21 was evaluated by measuring the volume of PDC removed versus the volume of Barre granite workpiece removed, while the workpiece was cooled with water, using the same workpiece and same test parameters as comparative working example 19. FIG. 15 shows the abrasion resistance test results for the three PDCs of working example 21, which are labeled Working Example 21a, 21b, and 21c. The PDCs of working example 21 exhibited an abrasion resistance that was greater than comparative working examples 19 and 20 as represented by the lower volume of the PDC removed for a given volume of the workpiece removed.

The thermal stability of the PCD tables of working examples 21a, 21b, and 21c were also evaluated by measuring the distance cut in a Barre granite workpiece prior to failure, without using coolant, using the same workpiece and same test parameters as comparative working example 19. The PCD tables of working examples 21a, 21b, and 21c were able to cut a distance of about 3250, about 3500, and about 3800 linear feet, respectively, in the workpiece prior to failure. Thus, the PCD tables of each PDC were significantly more thermally stable than the PCD table of comparative working example 19 and the leached PCD table of comparative working example 20.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall have the same meaning as the word "comprising" and variants thereof (e.g., "comprise" and "comprises").

What is claimed is:
1. A polycrystalline diamond compact, comprising:
a cemented carbide substrate including a first cemented carbide portion that is substantially free of chromium carbide and a second cemented carbide portion bonded to the first cemented carbide portion, the second cemented carbide portion including chromium carbide, the second cemented carbide portion at least partially surrounding a lateral periphery of the first cemented carbide portion; and
a polycrystalline diamond table bonded to at least the first cemented carbide portion, the polycrystalline diamond table including a plurality of bonded diamond grains exhibiting diamond-to-diamond bonding therebetween, the plurality of bonded diamond grains defining a plurality of interstitial regions, at least a portion of the polycrystalline diamond table including chromium present in a concentration less than about 1.0 weight % ("wt %").

2. The polycrystalline diamond compact of claim 1 wherein the polycrystalline diamond table is substantially free of chromium.

3. The polycrystalline diamond compact of claim 1 wherein the concentration of chromium present in the at least a portion of the polycrystalline diamond table is less than about 0.25 wt %.

4. The polycrystalline diamond compact of claim 1 wherein the lateral periphery of the first cemented carbide portion is substantially surrounded by the second cemented carbide portion.

5. The polycrystalline diamond compact of claim 1 wherein the first cemented carbide portion exhibits a substantially conical geometry.

6. The polycrystalline diamond compact of claim 1, further comprising an interface between the first cemented carbide portion and the second cemented carbide substrate.

7. The polycrystalline diamond compact of claim 1 wherein the polycrystalline diamond table is integrally formed with at least the first cemented carbide portion or the polycrystalline diamond table is a pre-sintered polycrystalline diamond table.

8. The polycrystalline diamond compact of claim 1 wherein the polycrystalline diamond table comprises an exterior surface from which a leached region inwardly extends, the leached region at least partially depleted of metal-solvent catalyst.

9. The polycrystalline diamond compact of claim 1 wherein the second cemented carbide portion comprises about 1.0 wt % to about 2.0 wt % chromium carbide.

10. A polycrystalline diamond compact, comprising:
a cemented carbide substrate including:

a first cemented carbide portion that is substantially free of chromium carbide and includes a metallic infiltrant; and a second cemented carbide portion bonded to the first cemented carbide portion, the second cemented carbide portion including chromium carbide, the second cemented carbide portion at least partially surrounding a lateral periphery of the first cemented carbide portion; and a polycrystalline diamond table bonded to at least the first cemented carbide portion, the polycrystalline diamond table including a plurality of bonded diamond grains exhibiting diamond-to-diamond bonding therebetween, the plurality of bonded diamond grains defining a plurality of interstitial regions, the polycrystalline diamond table including chromium present in a concentration less than about 0.25 weight % ("wt %"), the polycrystalline diamond table including an upper exterior surface remote from the cemented carbide substrate from which a leached region inwardly extends, the leached region at least partially depleted of the metallic infiltrant infiltrated from the first cemented carbide portion of the cemented carbide substrate.

* * * * *

UNITED STATES PATENT AND TRADEMARK OFFICE
CERTIFICATE OF CORRECTION

PATENT NO.        : 8,216,677 B2                              Page 1 of 1
APPLICATION NO.   : 12/649784
DATED             : July 10, 2012
INVENTOR(S)       : Debkumar Mukhopadhyay et al.

It is certified that error appears in the above-identified patent and that said Letters Patent is hereby corrected as shown below:

In The Claims

Column 28
Line 52, change "substrate" to --portion--

Signed and Sealed this
Twenty-seventh Day of January, 2015

Michelle K. Lee
*Deputy Director of the United States Patent and Trademark Office*